US012560852B2

(12) United States Patent
Ozaki et al.

(10) Patent No.: US 12,560,852 B2
(45) Date of Patent: Feb. 24, 2026

(54) SEMICONDUCTOR IQ MODULATOR

(71) Applicant: NTT, Inc., Tokyo (JP)

(72) Inventors: Josuke Ozaki, Musashino (JP);
Yoshihiro Ogiso, Musashino (JP);
Yasuaki Hashizume, Musashino (JP);
Hiromasa Tanobe, Musashino (JP);
Mitsuteru Ishikawa, Musashino (JP)

(73) Assignee: NTT, Inc., Tokyo (JP)

( * ) Notice: Subject to any disclaimer, the term of this
patent is extended or adjusted under 35
U.S.C. 154(b) by 395 days.

(21) Appl. No.: 18/040,028

(22) PCT Filed: Aug. 3, 2020

(86) PCT No.: PCT/JP2020/029726
§ 371 (c)(1),
(2) Date: Jan. 31, 2023

(87) PCT Pub. No.: WO2022/029855
PCT Pub. Date: Feb. 10, 2022

(65) Prior Publication Data
US 2023/0273497 A1     Aug. 31, 2023

(51) Int. Cl.
G02F 1/21 (2006.01)
G02F 1/225 (2006.01)
(Continued)

(52) U.S. Cl.
CPC ............ G02F 1/212 (2021.01); G02F 1/2255
(2013.01); H04B 10/5053 (2013.01);
(Continued)

(58) Field of Classification Search
CPC .. G02F 1/212; G02F 1/2255; G02F 2201/127;
G02F 1/0136; G02F 1/025;
(Continued)

(56) References Cited

U.S. PATENT DOCUMENTS

2013/0141772 A1* 6/2013 Jiang ................ H04B 10/50575
359/279
2014/0212136 A1* 7/2014 Akiyama ............. H04B 10/532
398/183
(Continued)

FOREIGN PATENT DOCUMENTS

JP       2019-194722 A    11/2019
WO      2017/085447 A1    5/2017
WO      2018/174083 A1    9/2018

OTHER PUBLICATIONS

J. Ozaki, et al., *Ultra-low Power Dissipation (<2.4 W) Coherent InP
Modulator Module with CMOS Driver IC*, Mo3C.2, ECOC, 2018,
pp. 1-3.

(Continued)

*Primary Examiner* — Leslie C Pascal
(74) *Attorney, Agent, or Firm* — Workman Nydegger

(57)        ABSTRACT

A semiconductor IQ optical modulator in which a phase
modulation unit is configured by a differential capacitively
loaded traveling-wave electrode structure based on an SS
line configuration, phase modulation units of adjacent chan-
nels are spaced apart from each other by 400 μm or more, a
distance between main signal lines of the capacitance load-
ing type structure is 60 μm or less, a DC phase adjustment
electrode and a PAD are provided between an I side phase
modulation unit and a Q side phase modulation unit, the DC
phase adjustment electrode is spaced apart by at least 80 μm
or more from a signal line of the phase adjustment unit, and
a crosstalk characteristic between the adjacent channels is
−30 dB or less in a required frequency band.

8 Claims, 20 Drawing Sheets

(51) Int. Cl.

| | |
|---|---|
| *H04B 10/50* | (2013.01) |
| *H04B 10/548* | (2013.01) |
| *H04B 10/556* | (2013.01) |
| *H04B 10/588* | (2013.01) |

(52) U.S. Cl.
CPC ..... *H04B 10/50597* (2013.01); *H04B 10/548* (2013.01); *H04B 10/5561* (2013.01); *H04B 10/588* (2013.01)

(58) Field of Classification Search
CPC .......... H04B 10/5053; H04B 10/50597; H04B 10/548; H04B 10/5561; H04B 10/588; G02B 2006/12119; G02B 2006/12142
See application file for complete search history.

(56) References Cited

U.S. PATENT DOCUMENTS

| | | | |
|---|---|---|---|
| 2015/0293427 | A1 | 10/2015 | Goi et al. |
| 2020/0026145 | A1 | 1/2020 | Ogiso et al. |

OTHER PUBLICATIONS

N. Wolf, et al., *Electro-Optical Co-Design to Minimize Power Consumption of a 32 GBd Optical IQ-Transmitter Using InP MZ-Modulators*, CSICS, 2015, 1-4.

* cited by examiner

-- PRIOR ART --

Fig. 2

-- PRIOR ART --

-- PRIOR ART --

SEMICONDUCTOR IQ MODULATOR

TECHNICAL FIELD

The present invention relates to an ultra-high-speed semiconductor IQ optical modulator that performs IQ modulation of an optical signal with an electrical signal.

BACKGROUND ART

In order to cope with increasing communication traffic demand, a high-speed optical modulator compatible with an advanced optical modulation system is required. In particular, multi-level optical modulators that use digital coherent technique play a major role in realizing a large-capacity transceiver exceeding 100 Gbps. In these multi-level optical modulators, Mach-Zehnder (MZ) modulators (MZMs) capable of zero chirp drive on an MZ interferometer type are incorporated in parallel in multiple stages in order to add independent signals respectively to the amplitude and phase of light.

In a polarization multiplexing type IQ optical modulator that has spread to communication networks, two MZ optical waveguides having a so-called nested structure in which each arm of a parent MZM is constituted by a child MZM are provided in parallel corresponding to X and Y polarization channels and are constituted by an MZM (quad-parallel MZM) having a total of four child MZMs. The two arms of each child MZM are provided with a traveling wave type electrode to which a radio frequency (RF) modulated electrical signal for performing a modulation operation on an optical signal propagating in the optical waveguide is inputted. In each polarization channel, one of the two child MZMs forming such a pair corresponds to an I channel, and the other corresponds to a Q channel.

The polarization multiplexing type IQ optical modulator inputs an RF modulated electrical signal to one end of a modulation electrode provided along the arm optical waveguide of the child MZM, thereby generating an electro-optical effect and applying phase modulation to two optical signals propagating in the optical waveguide of the child MZM. (Patent Literature 3)

Moreover, although a polarization multiplexing type IQ optical modulator is one of IQ optical modulators, an optical signal used in an IQ optical modulator is not limited to two polarization optical signals, and an IQ optical modulator that uses a single polarization optical signal is also known. In the case of a single polarization, one nested structure MZM is configured.

Furthermore, downsizing and reduction of a driving voltage of an optical transmitter module have been issues in recent years, and research and development of a semiconductor MZ modulator that is compact and can reduce a driving voltage have been actively advanced. Furthermore, in the research and development of semiconductor MZ modulators, the movement for higher baud rates such as 64 GBaud or 100 GBaud is accelerating, and widening the band of optical modulators is required.

Under such circumstances, research and development of a high bandwidth coherent driver modulator (HB-CDM) aiming to improve the radio frequency characteristic and realize downsizing by integrating a driver and a modulator in one package and performing cooperative design of the driver and the modulator in addition to characteristic improvement using only the modulator have been accelerated. (Non Patent Literature 1)

In the present configuration, since the modulator is integrated with a differentially driven driver, it is desirable that the modulator itself is configured based on differential driving.

In the configuration of the HB-CDM, since the driver and the modulator are integrated, design including not only the modulator but also the driver is extremely important. In particular, in the HB-CDM, an open collector type (or open drain type) driver is used in order to achieve low power consumption. (Non Patent Literature 1, Non Patent Literature 2)

Therefore, a differential capacitance-loaded traveling wave type electrode structure based on a differential radio frequency line such as GSSG and GSGSG (G: ground, S: signal) is used as a layout on a modulator chip for realizing such high-speed operation. (Patent Literature 1)

A configuration such as GSSG and GSGSG in which a ground (GND) line is arranged in the vicinity of a signal line is a very desirable structure as a differential line configuration and can be said to be a most desirable configuration from the viewpoint of suppressing crosstalk between channels.

On the other hand, since it is necessary to arrange a plurality of ground metals as GND lines, there is a problem that a pattern cannot be arranged between channels in order to cause the ground to effectively work and obtain a sufficient crosstalk suppression effect, or since the GND line is a differential line, it is necessary to arrange the ground symmetrically with respect to the signal line, or the chip size becomes large if the layout configuration is adopted.

CITATION LIST

Patent Literature

Patent Literature 1: JP 2019-194722 A
Patent Literature 2: WO/2017/085447 A
Patent Literature 3: WO/2018/174083 A

Non Patent Literature

Non Patent Literature 1: J. Ozaki, et al., "Ultra-low Power Dissipation (<2.4 W) Coherent InP Modulator Module with CMOS Driver IC", Mo3C.2, ECOC, 2018 Non Patent Literature 2: N. Wolf, et al., "Electro-Optical Co-Design to Minimize Power Consumption of a 32 GBd Optical IQ-Transmitter Using InP MZ-Modulators", CSICS, 2015

Next, an example of a polarization multiplexing type IQ optical modulator 100 having a conventional structure is illustrated in a plan view of FIG. 1. Input light 101 inputted from the center of the right end (one end of two short directions) of a chip 120 of the polarization multiplexing type IQ optical modulator 100 in FIG. 1 passes through an input optical waveguide 102 extended between nested structure MZMs 104X and 104Y for two X and Y polarization channels, and is branched by an optical branching circuit 103 at the left end of the chip. After the branching, the two rays of light folded by 180° are inputted respectively to the nested structure MZM 104X for the X polarization channel and the nested structure MZM 104Y for the Y polarization channel. In the nested structure MZM 104X and the nested structure MZM 104Y, light of each polarization channel is optically modulated by eight RF modulation signals 108 (not individually shown) inputted from the left end of the chip (the other end of two short directions), and is outputted as modulated output light 110X and 110Y from an upper portion and a lower portion of the right end of the chip. That is, in FIG. 1, the RF modulation signals propagate in parallel in the direction from the left end to the right end of the chip 120 (along the longitudinal direction orthogonal to two opposing short directions).

Figure 2:
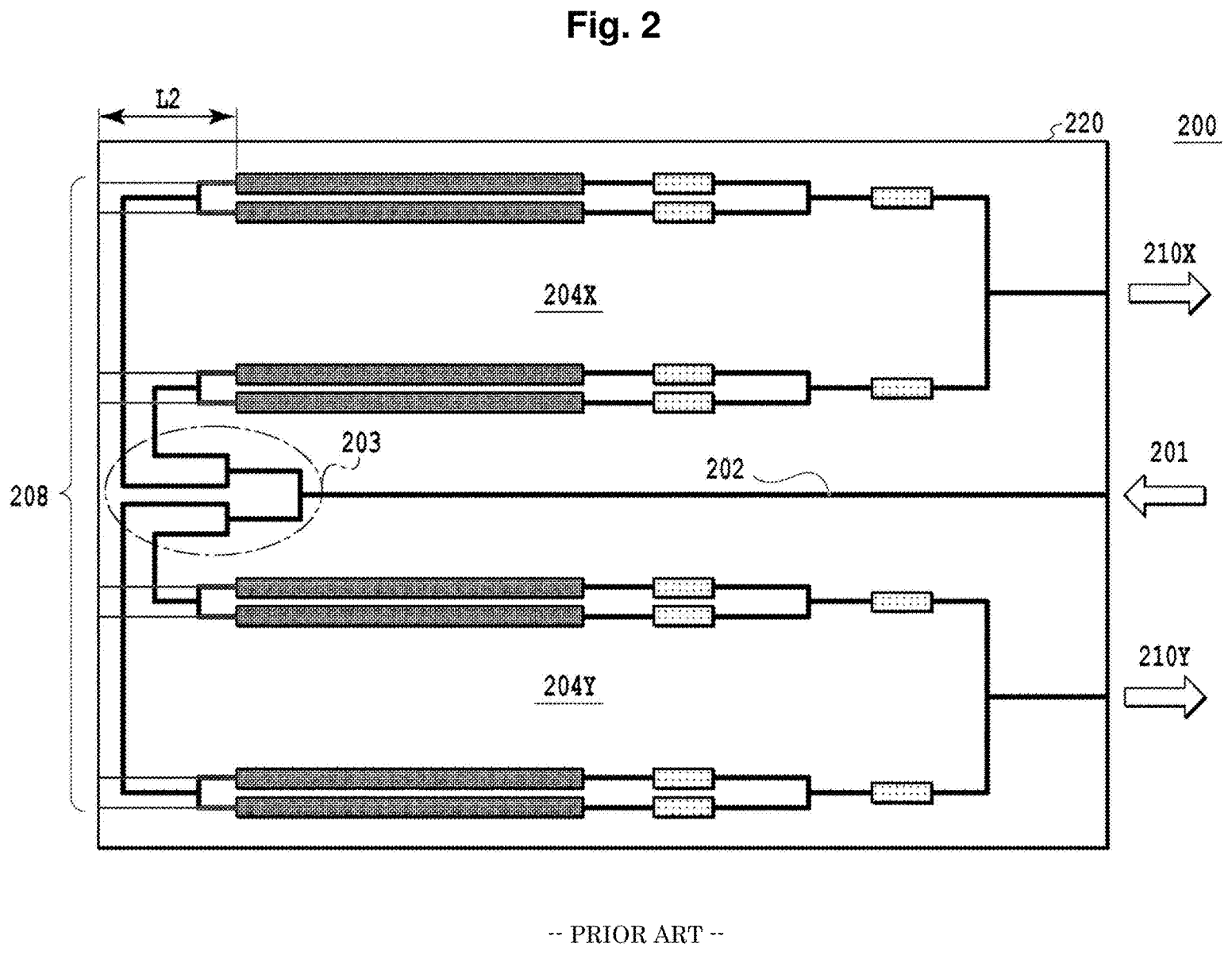

FIG. 2 is a plan view illustrating another example of a polarization multiplexing type IQ optical modulator 200 having a similar conventional structure. In FIG. 2, the propagation direction of the RF modulation signal is a direction (longitudinal direction) from the left end to the right end of a chip 220 as in FIG. 1. Moreover, FIG. 3 is a plan view illustrating a specific layout on the chip in FIG. 2 (Patent Literature 2, FIG. 7). In FIG. 3, light is inputted and outputted from the right end of the chip, the RF modulation signals are inputted from the left end of the chip, and the propagation direction of the RF modulation signals is a direction from the left end to the right end of the chip, but the propagation direction of the RF modulation signal is the short direction of the chip.

Although the two conventional structures in FIGS. 1 and 2 are common in that an input optical waveguide 202 is provided between the X polarization channel and the Y polarization channel, the structure of an optical branching circuit 203 in the polarization multiplexing type IQ optical modulator 200 in FIG. 2 is different from that in FIG. 1. The optical branching circuit 103 in FIG. 1 has a symmetrical structure between I and Q channels, while the optical branching circuit in FIG. 2 has an asymmetrical structure between I and Q channels.

When considering the characteristics of the radio frequency line that contributes to phase modulation, the configuration of FIG. 2 that can shorten the length from the chip end to the phase modulation unit as much as possible is desirable.

Moreover, FIG. 4 is a plan view illustrating still another example of a polarization multiplexing type IQ optical modulator having a conventional structure (Patent Literature 2, FIG. 6). In FIG. 4, the propagation direction of the RF modulation signal is the short direction from the left end to the right end of the chip as in FIG. 3.

In FIG. 4, input light is branched on the input side of the chip, and two light input waveguides are provided outside the optical modulation region (all channels).

With this structure, since a functional circuit such as a phase adjuster or an optical amplifier can be provided outside the chip, there is an advantage that independence from the radio frequency characteristic can be achieved.

In FIGS. 1 and 2, since the phase adjustment electrodes are arranged on the same straight line as the RF lines in the longitudinal direction, there is a possibility that the length in the longitudinal direction becomes long and the chip size becomes large as compared with FIG. 3.

On the other hand, since a layout in which the RF lines and the phase adjustment electrodes are arranged in parallel in the short direction and the RF lines and the phase adjustment electrodes are aligned in the longitudinal direction can be adopted as illustrated in FIGS. 3 and 4, the length of the chip in the propagation direction of the RF modulation signals can be shortened as compared with FIGS. 1 and 2. However, with the configurations in FIGS. 3 and 4, there is a possibility that the crosstalk characteristic between the two IQ modulators on the X side and the Y side, which are considered to be the most important among the crosstalk characteristics, is deteriorated.

Moreover, when considering the connection with the driver, it is desirable that the inter-channel distance of the RF lines is constant. However, since it is difficult to set the inter-channel pitches at equal intervals in FIG. 3, it cannot be said that the layout is very desirable.

When considering the layouts in FIGS. 3 and 4 from the viewpoint that the inter-channel distance between the RF lines is constant, the phase modulation electrode is arranged between the two IQ modulators on the X side and the Y side in the layout in FIG. 3, and therefore, there is a problem that the crosstalk characteristic between the IQ modulators may be deteriorated.

Moreover, regarding FIG. 4, it is considered that there is no problem if it is assumed that there is no phase adjustment electrode between the two IQ modulators and the distance between the IQ modulators is sufficiently taken, while the phase adjustment electrodes are arranged on the end side in the short direction of the chip, and therefore, there is a possibility that the size in the short direction increases although the size can be reduced in the longitudinal direction (direction orthogonal to the propagation direction of the RF modulation signals).

Conventionally, from the viewpoint of crosstalk, a differential line configuration of GSSG in which ground electrodes are arranged on both sides of differential signal electrodes (Signal, /Signal) ("/" represents a signal of opposite polarity) or GSGSG in which a ground electrode is further arranged between differential signals (Signal, /Signal) has been generally used as a radio frequency line of an IQ modulator. In such a configuration of GSSG or GSGSG, since it is necessary to secure a ground area, the layout is strictly limited. For example, there is a case where an electrode for phase adjustment or the like cannot be arranged around the ground electrode due to the presence of the ground electrode, and there is a problem that the chip size naturally increases since it is necessary to secure a ground area on the edge side of the modulator chip in order to ensure symmetry. An object of embodiments of the present invention is to downsize and integrate a semiconductor IQ modulator by making an SS line (two of Signal and/Signal constitute a differential signal line) without deterioration of the crosstalk characteristic and optimizing the layout of a phase modulation electrode and an RF line.

In order to achieve such an object, an embodiment of the present invention provides an IQ modulator including at least two or more Mach-Zehnder modulators configured using a differential transmission line in which two signal lines for transmitting a radio frequency modulation signal including a differential signal are coupled, the IQ modulator being characterized in that the differential transmission line has an SS line configuration, the SS line configuration consists of a straight lead-out line, a phase modulation unit, and a termination resistor that are connected by a straight line, the phase modulation unit includes the differential transmission line having a differential capacitively loaded traveling-wave electrode structure as a phase modulation electrode, the phase modulation electrodes of the phase modulation units between adjacent channels are spaced apart by at least 400 μm or more, a distance between main signal lines of the differential capacitively loaded traveling-wave electrode structure is 60 μm or less, a DC phase adjustment electrode for adjusting an operating point of the Mach-Zehnder modulator and a PAD for the DC phase adjustment electrode are provided between the phase modulation unit on an I channel side and the phase modulation unit on a Q channel side, the DC phase adjustment electrode is spaced apart from the phase modulation electrode of the phase modulation unit by at least 80 μm or more, and near-end and far-end crosstalk characteristics of a differential signal between adjacent channels are −30 dB or less in a required frequency bandwidth.

As described above, according to an embodiment of the present invention, the SS differential radio frequency line can be formed without deterioration of the crosstalk characteristic of the radio frequency line in the driver integrated semiconductor IQ modulator, and the size can be reduced because there is no ground electrode. Furthermore, by optimizing the layout of the phase modulation electrode and the RF line, the chip size of the semiconductor IQ modulator can be further reduced and the semiconductor IQ modulator can be integrated.

BRIEF DESCRIPTION OF DRAWINGS

FIG. 2 is a plan view illustrating another example of a polarization multiplexing type IQ modulator having a conventional structure.

FIG. 9 is a diagram illustrating a simplified image of a termination portion of a radio frequency line portion of a polarization multiplexing type IQ modulator according to an embodiment of the present invention.

FIG. 20 is a diagram for explaining wire connection of the IQ modulator according to an embodiment of the present invention with a driver IC.

DESCRIPTION OF EMBODIMENTS

Hereinafter, embodiments of the present invention will be described with reference to the drawings.

First Embodiment

Figure 1:
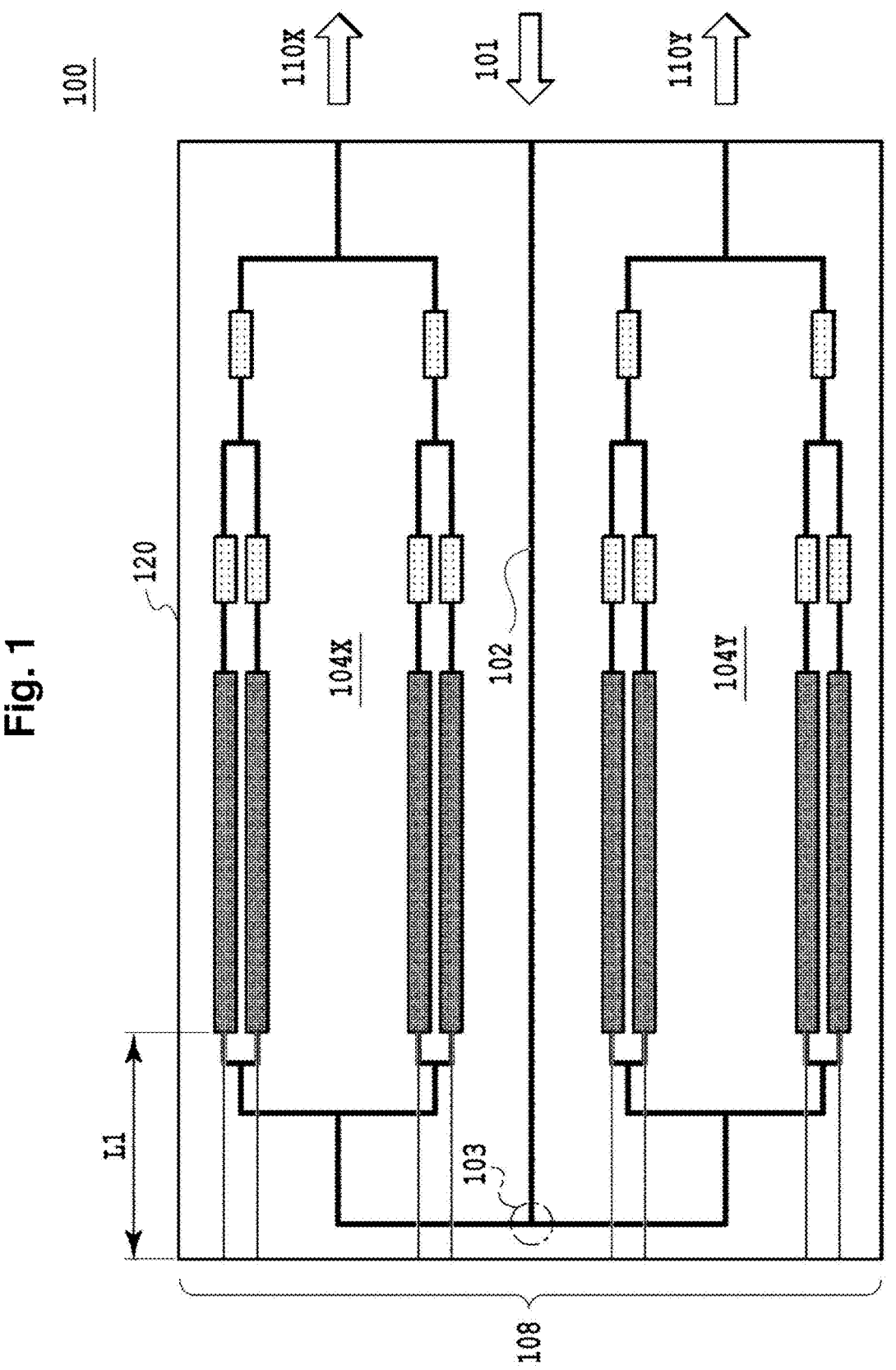
FIG. 1 is a plan view illustrating an example of a polarization multiplexing type IQ modulator having a conventional structure.
Figure 3:
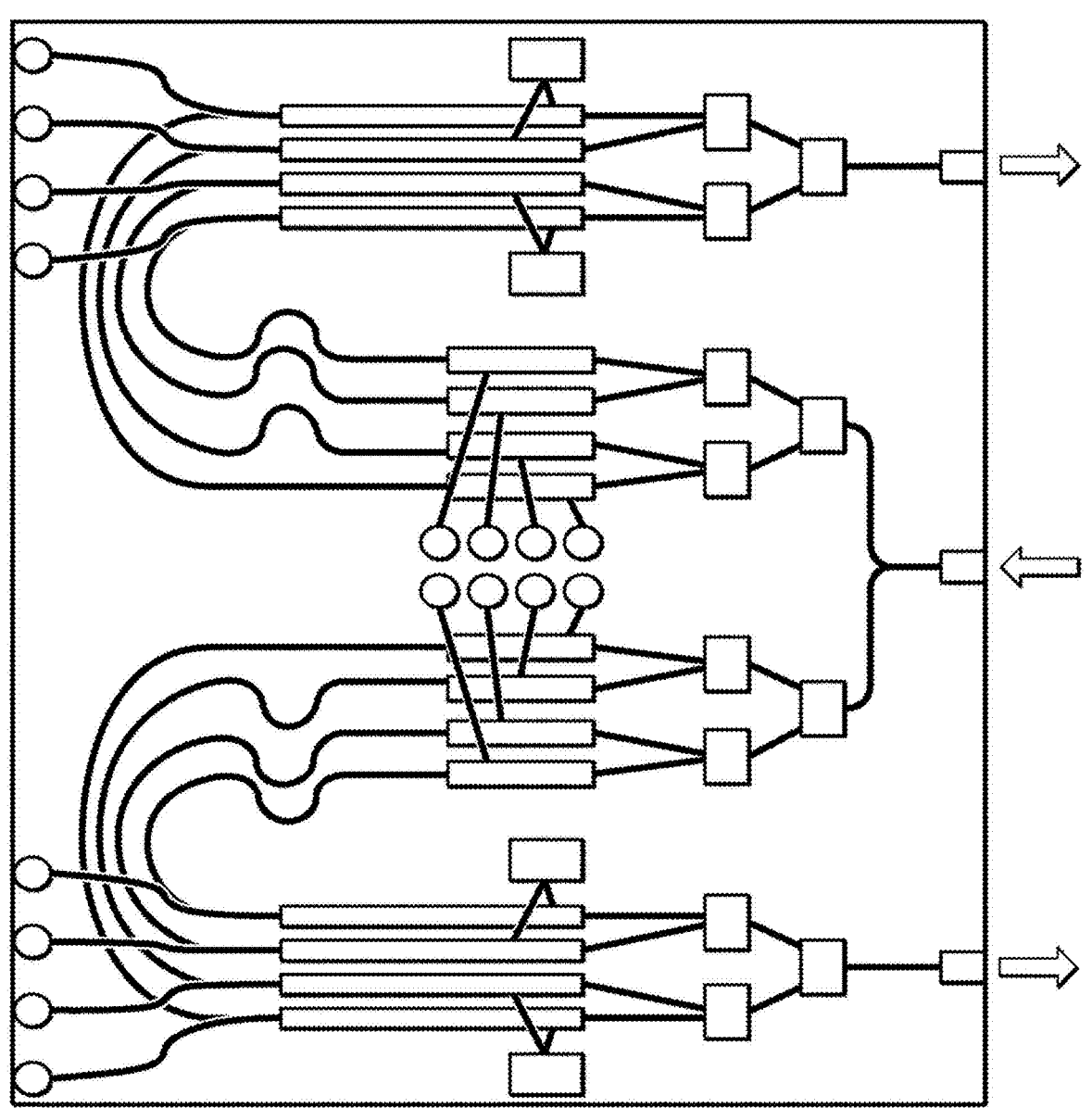
FIG. 3 is a plan view illustrating a specific layout on a chip in FIG. 2.
Figure 4:
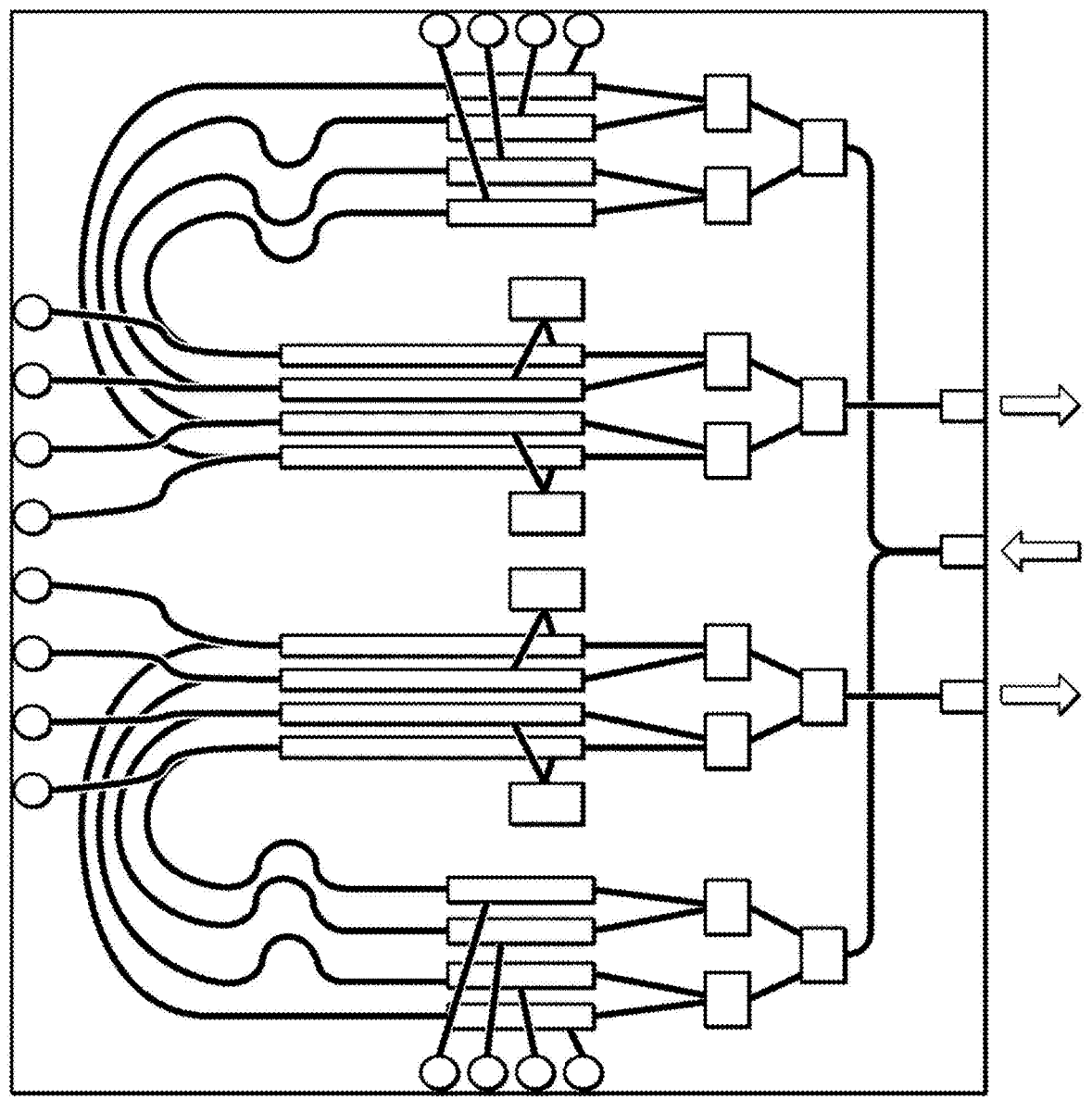
FIG. 4 is a plane illustrating still another example of a polarization multiplexing type IQ modulator having a conventional structure.
Figure 5:
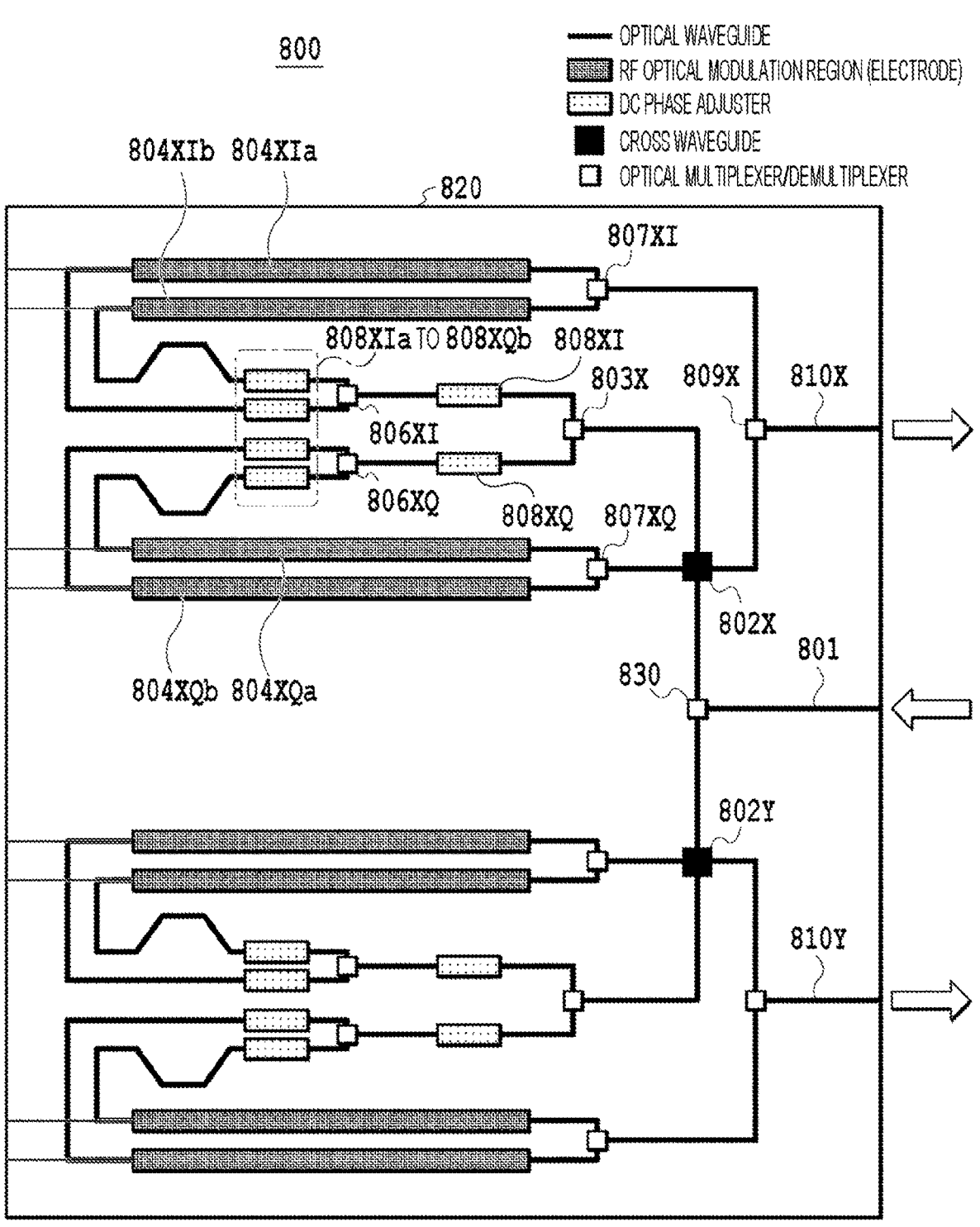
FIG. 5 is a plan view illustrating an example of a chip layout of a polarization multiplexing type IQ modulator according to an embodiment of the present invention.
Figure 6:
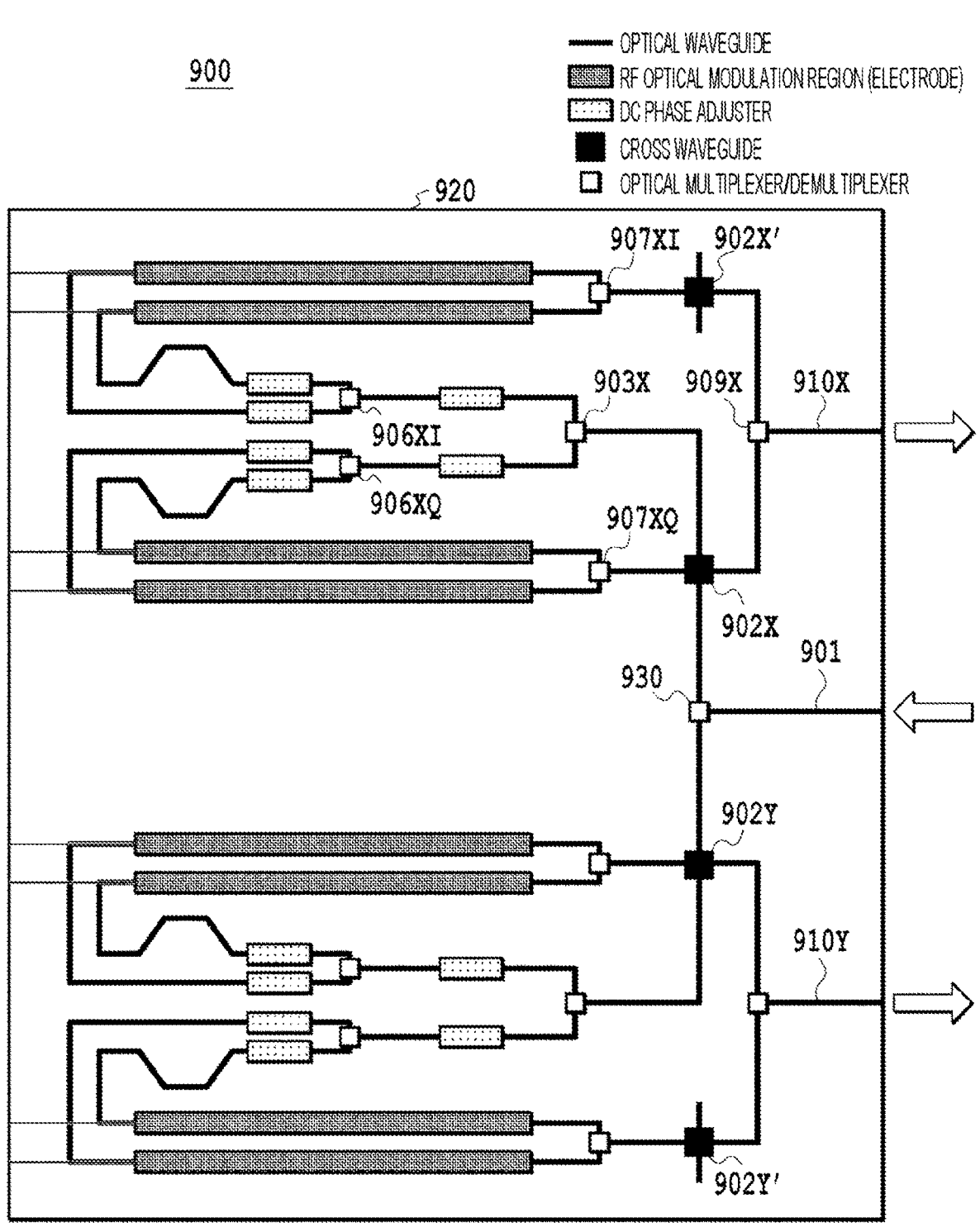
FIG. 6 is a plan view illustrating another example of a chip layout of a polarization multiplexing type IQ modulator according to an embodiment of the present invention.
Figure 7:
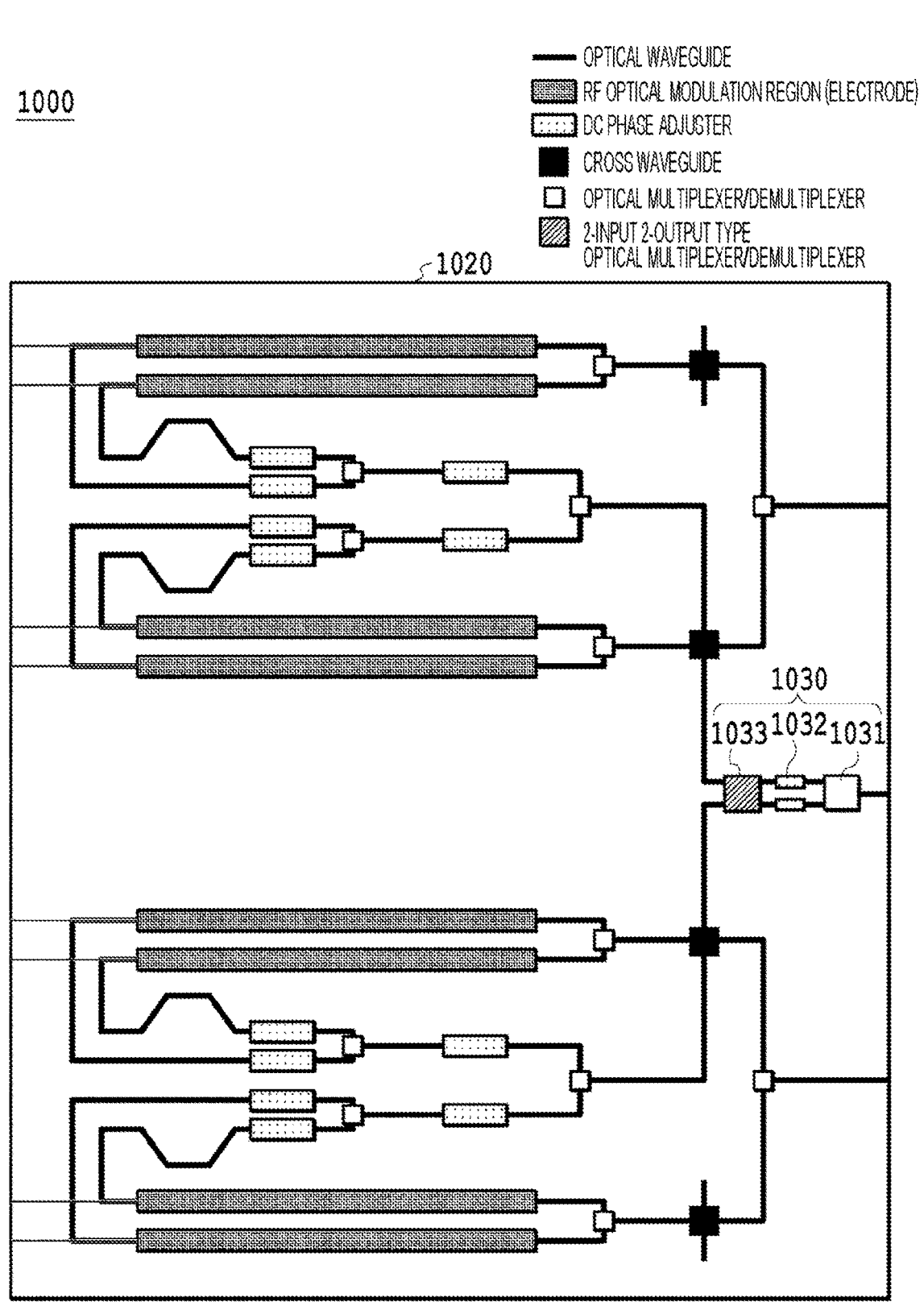
FIG. 7 is a plan view illustrating still another example of a chip layout of a polarization multiplexing type IQ modulator according to an embodiment of the present invention.

FIGS. 5, 6, and 7 illustrate an example of a layout of optical waveguides and electrodes of a chip related to an IQ modulator according to a first embodiment of the present invention. The example will be described representatively with reference to FIG. 5.

FIG. 5 illustrates a basic form of a chip layout of a polarization multiplexing type IQ modulator according to the present embodiment.

First, the optical layout will be described focusing on the arrangement of the optical waveguides and the optical multiplexers/demultiplexers. A polarization multiplexing type IQ modulator 800 illustrated in FIG. 5 includes an input optical waveguide 801, an XY polarization separator 830, optical cross waveguides 802X and 802Y, a first optical demultiplexer 803X, second optical demultiplexers 806XI and 806XQ, first optical multiplexers 807XI and 807XQ, a second optical multiplexer 809X, output optical waveguides 810X and 810Y, phase adjusters 808XI and 808XQ, DC phase adjusters 808XIa, 808XIb, 808XQa, and 808XQb, and differential modulation electrodes 804XIa, 804XIb, 804XQa, and 804XQb on a chip 820. The polarization multiplexing type IQ modulator 800 is constituted by a total of four MZ interferometers, in which IQ modulators including two nested MZ interferometers each for the X polarization channel and the Y polarization channel are integrated in parallel on the chip 820.

In the polarization multiplexing type IQ optical modulator 800 in FIG. 5, light inputted from the input optical waveguide 801 at the center of the right end of the chip is separated into the X polarization channel and the Y polarization channel by the XY polarization separator 830, pulled into a space between I and Q channel optical modulation regions of the respective polarization channels via the optical cross waveguides 802X and 802Y, and is then branched and folded to be optically modulated.

The optically modulated light of the I and Q channel is then multiplexed for each polarization channel, and two rays of light are finally outputted as X-polarization modulated output light and Y-polarization modulated output light from the output optical waveguides 810X and 810Y joined with the same chip end surface as the input optical waveguide 801.

In this configuration, the second optical demultiplexers 806XI and 806XQ, which are optical demultiplexers of the child MZM, are provided between the I-channel optical modulation region and the Q-channel optical modulation region, and the light propagation direction in the second optical demultiplexer is opposite (180°) to the light propagation direction in the light modulation region.

With this configuration, since the DC phase adjusters 808XIa to 808XQb provided in the waveguide of the child MZM can be formed before folding, it is not necessary to form and arrange the DC phase adjuster in series with the RF electrode of the optical modulation region, and therefore, the chip length can be shortened and the chip can be downsized.

For example, although the DC phase adjusters 808XI and 808XQ of the parent MZM on the X polarization channel side can be provided between the first optical multiplexers 807XI and 807XQ and the second optical multiplexer 809X, it is desirable from the viewpoint of downsizing the chip that the DC phase adjusters of the parent MZM are provided between the first optical demultiplexer 803X and the second optical demultiplexers 806XI and 806XQ.

Moreover, in FIG. 5, since the two optical waveguides are aligned and folded after the second optical demultiplexers 806XI and 806XQ, which are optical demultiplexers of the child MZM, branch the light toward each arm of the child MZM, the optical waveguide that hits the inner (inward) arm of the two arms of the child MZM is provided with a bent portion for matching the optical path length with the outer (outward) arm, thereby making the length equal.

As the optical layout, the above arrangement is desirable in downsizing the chip.

However, when considered as an IQ optical modulator, it not enough that the modulator has the present layout for actual usage. In order to ensure a radio frequency characteristic, which is one of the most important item as characteristics of an IQ optical modulator, and to obtain good characteristics, it is necessary to devise structures and layouts of the radio frequency line, the DC phase adjustment electrodes of the child MZM and the parent MZM, and the PAD.

(Advantages of SS Differential Coupling Line)

From the viewpoint of downsizing, it is desirable that the radio frequency line for phase modulation is designed based on the SS differential coupling line.

In a case where a GSGSG line configuration or a GSSG line configuration more general as the differential line is selected, a ground metal is arranged between the channels, and therefore, it is certainly possible to ensure a sufficient crosstalk characteristic between the channels. However, since there are many ground metals, there is a disadvantage that the chip size increases or the layout of the phase modulation electrodes (824XIb1, 824XQa1 in FIG. 8) or the PAD thereof is limited.

For example, regarding a GSSG line configuration, a ground electrode is necessarily required on each of both sides of the SS when considering symmetry, and the number of electrodes is twice as large as that in the SS line configuration.

Therefore, regarding a polarization multiplexing type IQ modulator, for example, since a ground metal is required on the chip edge side, the size in the width direction of the chip (direction perpendicular to the propagation direction of the radio frequency signal) becomes larger than that of the SS line configuration, and the area of the ground electrode increases.

FIGS. 6 and 7 illustrate two other examples of a layout of an IQ modulator according to a variation of the present embodiment. Similarly to the polarization multiplexing type IQ modulator 800 illustrated in FIG. 5, a polarization multiplexing type IQ modulator 900 illustrated in FIG. 6 includes an input optical waveguide 901, an XY polarization separator 930, optical cross waveguides 902X and 902Y, a first optical demultiplexer 903X, second optical demultiplexers 906XI and 906XQ, first optical multiplexers 907XI and 807XQ, a second optical multiplexer 909X, and output optical waveguides 910X and 910Y on a chip 920. Moreover, on the chip 920 of the IQ modulator 900, phase adjusters, DC phase adjusters, and differential modulation electrodes are arranged in the same arrangement as that of FIG. 5, and the polarization multiplexing type IQ modulator 900 is constituted by a total of four MZ interferometers, in which IQ modulators including two nested MZ interferometers each for the X polarization channel and the Y polarization channel are integrated in parallel on the chip 920. Moreover, FIG. 6 shows that optical cross waveguides that do not supply crossing light, that is, dummy optical cross waveguides 902X' and 902Y' are provided, and the number of waveguide crossings between X channel and Y channel and between I channel and Q channel are equalized, thereby eliminating a difference in optical characteristics between the channels.

On a chip 1020 of a polarization multiplexing type IQ modulator 1000 illustrated in FIG. 7, an optical cross waveguide, a first optical demultiplexer, second optical demultiplexers, first optical multiplexers, a second optical multiplexer, output optical waveguides, phase adjusters, DC phase adjusters, and differential modulation electrodes are arranged in the same arrangement as that of FIG. 6, and the polarization multiplexing type IQ modulator 1000 is constituted by a total of four MZ interferometers, in which IQ modulators including two nested MZ interferometers each for the X polarization channel and the Y polarization channel are integrated in parallel on the chip 1020. FIG. 7 illustrates an example in which an XY polarization separator 1030 connected with the optical cross waveguide is joined with a 1-input 2-output type optical demultiplexer 1031, a DC phase adjuster 1032, and a 2-input 2-output type optical multiplexer/demultiplexer 1033, so that PDL compensation can be achieved.

In order to realize the optical layouts illustrated in FIGS. 5, 6, and 7 each as a GSSG or GSGSG configuration, a region where the ground electrodes are arranged is required, and it becomes difficult to arrange the DC phase adjustment electrodes.

Needless to say, the ground electrode may be partially removed or formed in a shape with a hole, and the DC phase adjustment electrodes may be arranged in that part. However, this case is not desirable in consideration of the radio frequency characteristic because the ground electrode area for ensuring the radio frequency characteristic cannot be sufficiently ensured, or the radio frequency signal causes structural asymmetry such as the presence or absence of the ground electrode or the difference in the ground area between the right and left with respect to the propagation direction, leading to deterioration of the differential radio frequency characteristic or a possibility that a sufficient crosstalk suppression effect cannot be obtained as the ground.

From the above, the SS line configuration in which two signal lines are simply parallel is most excellent from the viewpoint of reducing the chip size.

Needless to say, since the SS line configuration is not shielded on the left and right by ground, there is a disadvantage that the SS line configuration is weak against noise. In particular, it should be noted that a bending structure having a high possibility of causing noise in the differential line causes significant radio frequency characteristic deterioration.

From the above viewpoint, it is desirable that the SS differential line configuration is used as a radio frequency line mainly including three elements of a lead-out wire portion, a phase modulation unit, and a termination portion for performing the phase modulation, and it is desirable that the three elements have a tapered shape or the like, the portions are smoothly connected while radio frequency impedance matching or the like is ensured, are not bended, and are configured only by a straight line with respect to the propagation direction of the radio frequency signal.

However, since the SS line configuration has no ground electrode, it is necessary to take a sufficient distance between channels or strengthen coupling between the SS lines of the same channel as compared with the electrode configuration of a GSSG or GSGSG configuration, so as to apply such a devise that the electromagnetic field distribution does not spread to the channel side in the vicinity. In the SS line configuration, it is important to devise such an electrode arrangement and the like in order to realize an excellent crosstalk characteristic as in the GSSG or GSGSG configuration in which the ground electrode shields the spread of the electromagnetic field distribution between the channels.

(Conditions of Positional Relationship of Electrodes of Present Invention)

Figure 8:
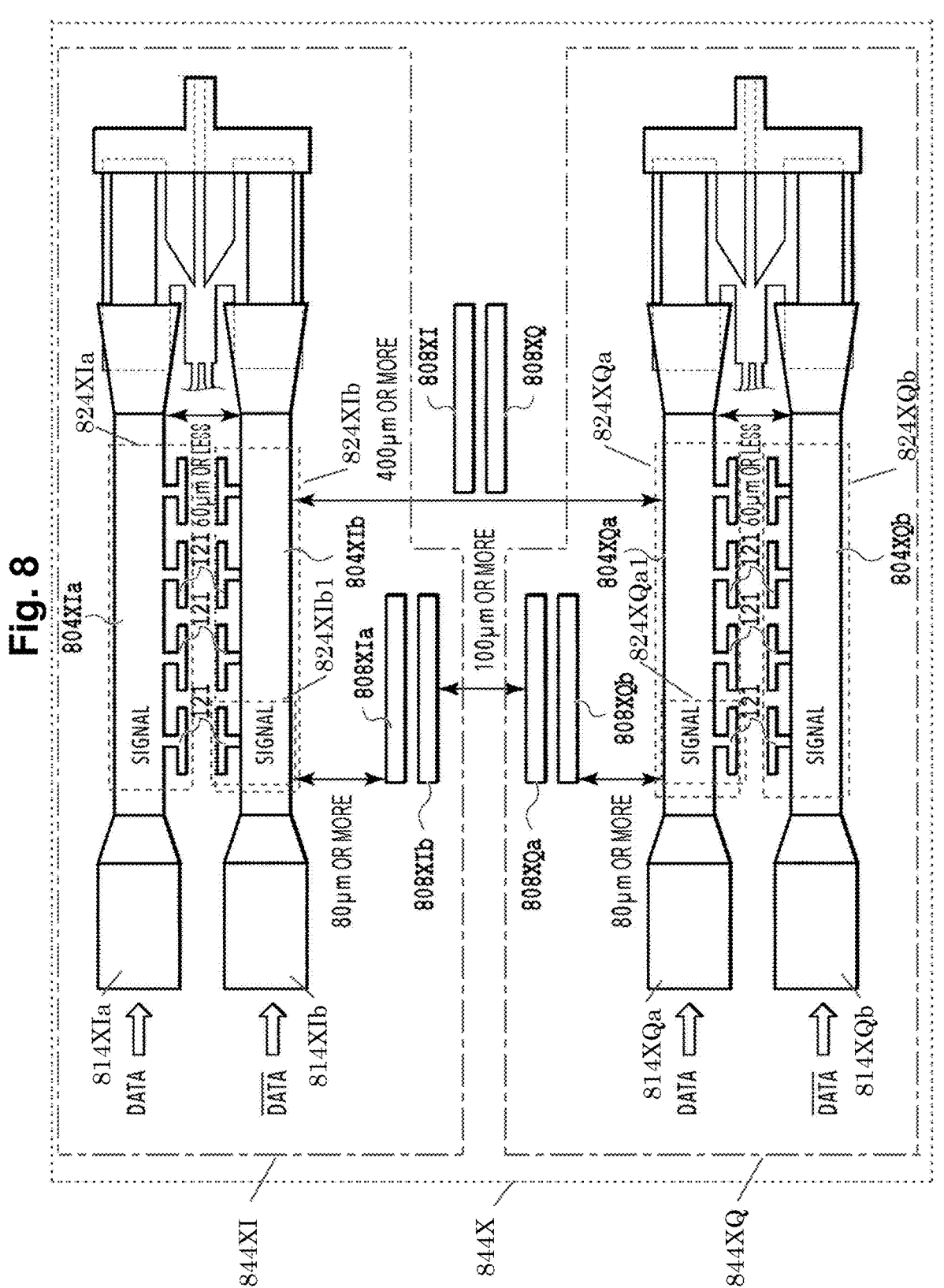
FIG. 8 is a diagram for explaining a positional relationship between respective electrodes on an X polarization channel side of a polarization multiplexing type IQ modulator according to an embodiment of the present invention.

FIG. 8 is a diagram for explaining a positional relationship between electrodes of the IQ modulator on the X polarization channel side in the polarization multiplexing type IQ optical modulator 800 in FIG. 5. The optical waveguides in FIG. 5 are omitted, and FIG. 8 illustrates the two pairs of capacitance-loaded type differential modulation electrodes 804XIa, 804XIb, 804XQa, and 804XQb on the X polarization channel side, and heater electrodes of the DC phase adjusters 808XI and 808XQ of the parent MZM 844X and the DC phase adjusters 808XIa to 808XQb of the child MZM 844XI, 844XQ, and illustrates a distance relationship between the positions of the electrodes (limitation on the distance between the electrodes).

Although only four pairs of loaded electrodes 121 of two pairs of capacitance-loaded type differential modulation electrodes facing each other in a T-shape and an inverse T-shape on the optical waveguide are exemplarily shown in FIG. 8, the loaded electrodes are arranged at a required density.

Although the IQ modulator on the Y polarization channel side is not shown, it is also important that there is no metal that may affect crosstalk such as a heater between the IQ modulator on the X polarization channel side and the IQ modulator on the Y polarization channel side.

Figure 9:
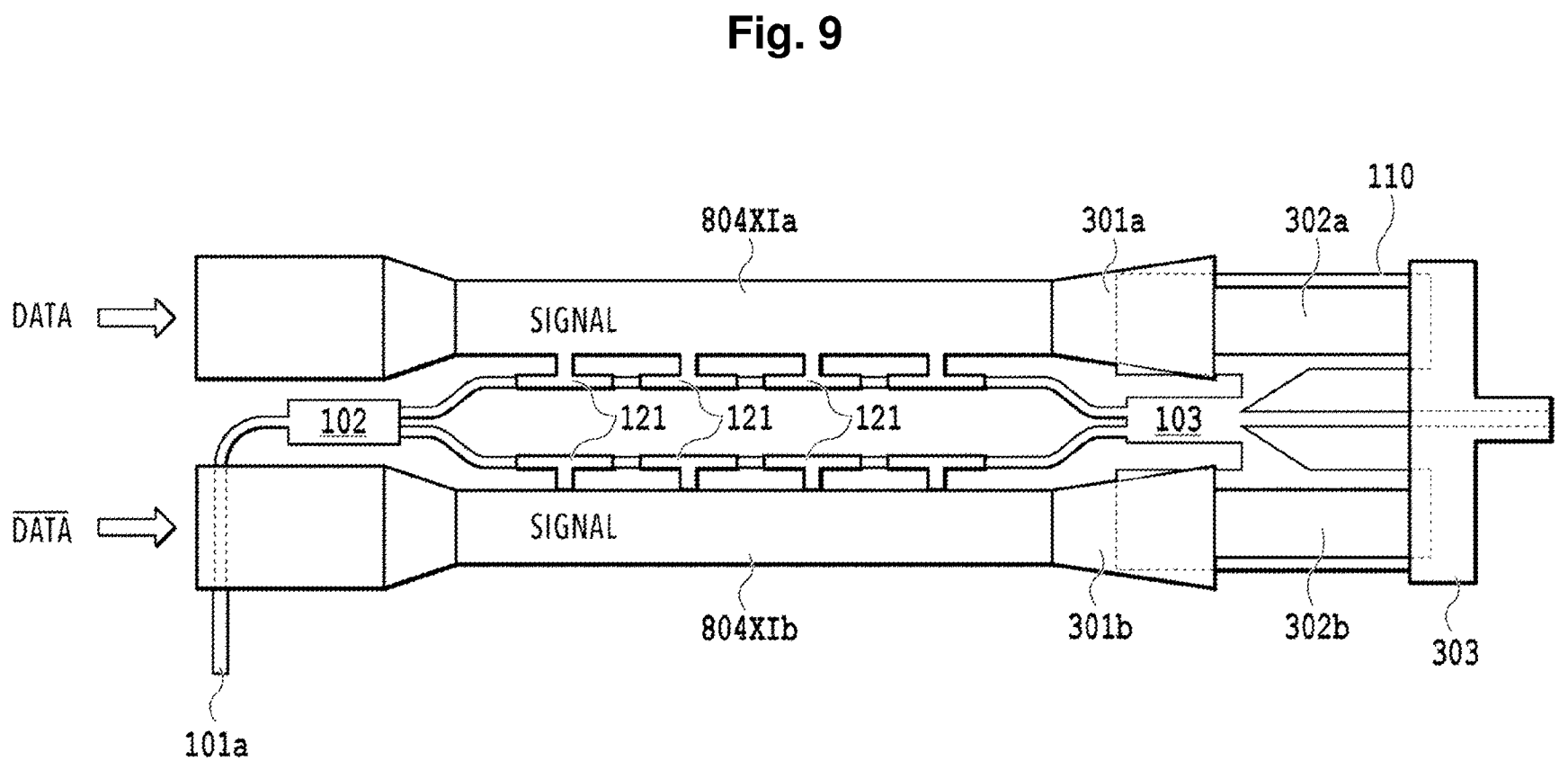

FIG. 9 illustrates a simplified image of a radio frequency line portion (differential modulation electrodes 804XIa and 804XIb). FIG. 9 also illustrates optical waveguides below the pairs of loaded electrodes 121 omitted from FIG. 8. Only four pairs of loaded electrodes 121 of capacitance-loaded type differential modulation electrodes are shown in FIG. 9 for simplicity. Although the lead-out line portion at the left end of the radio frequency line portion has a tapered structure similar to those of the connection pads 301a and

301b at the termination portion, for example, the tapered structure is not necessarily required for the lead-out line portion.

In the differential modulation electrodes 804XIa and 804XIb, which are differential radio frequency lines, two tapered connection pads 301a and 301b, and termination resistors 302a and 302b including two rectangular resistors following the two tapered connection pads are linearly arranged and formed at the right termination portion, and terminated on-chip. Right ends (termination sides) of the two termination resistors 302a and 302b are short-circuited by a conductive short-circuiting unit 303 made of metal or the like to become on-chip termination.

As illustrated in FIG. 8, DC phase adjustment electrodes (heaters), the PAD thereof, and lines to be led out to the PAD exist only inside between I and Q channels of the phase modulation unit. Between the two IQ modulators on the X-polarization side or the Y-polarization side, there is no metal that may affect crosstalk, such as a heater of the DC phase adjustment electrode.

As illustrated in FIG. 8, when considering a capacitance-loaded type traveling waveform electrode configuration (or capacitively loaded traveling-wave electrodes 824XIa, 824XIb, 824XQa, 824XQb) in which most of a radio frequency line portion is based on an SS differential line configuration, it is necessary that the phase modulation units between adjacent channels are spaced apart by at least 400 μm or more, and the main signal line distance of the capacitance-loaded structure constituting the differential line is 60 μm or less in at least one or more IQ modulators including at least two or more semiconductor Mach-Zehnder modulators configured using the capacitance loading type electrode structure.

Moreover, it is desirable that the differential modulation electrode 804XIb and the DC phase adjuster 808XIa of the child MZM are spaced apart by at least 80 μm or more, and the DC phase adjusters 808XIb and 808XQa of the child MZM are spaced apart by at least 100 μm or more.

Moreover, when considering integration with the driver IC as represented by HB-CDM, it is desirable that the inter-channel pitch is constant among all channels. At least the phase modulation unit needs to follow this rule.

Figure 10:
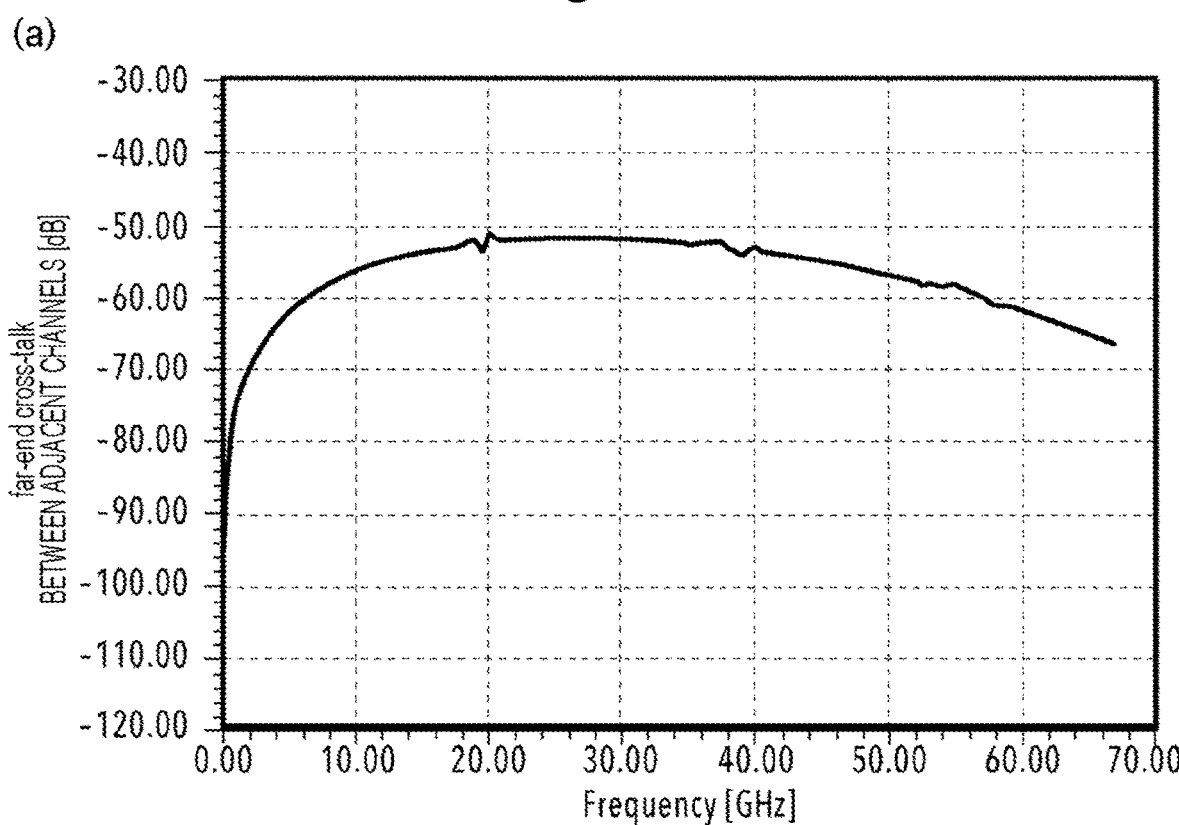
FIG. 10 is a diagram illustrating a simulation result of a crosstalk characteristic of a radio frequency line portion of a polarization multiplexing type IQ modulator according to an embodiment of the present invention.
Figure 10:
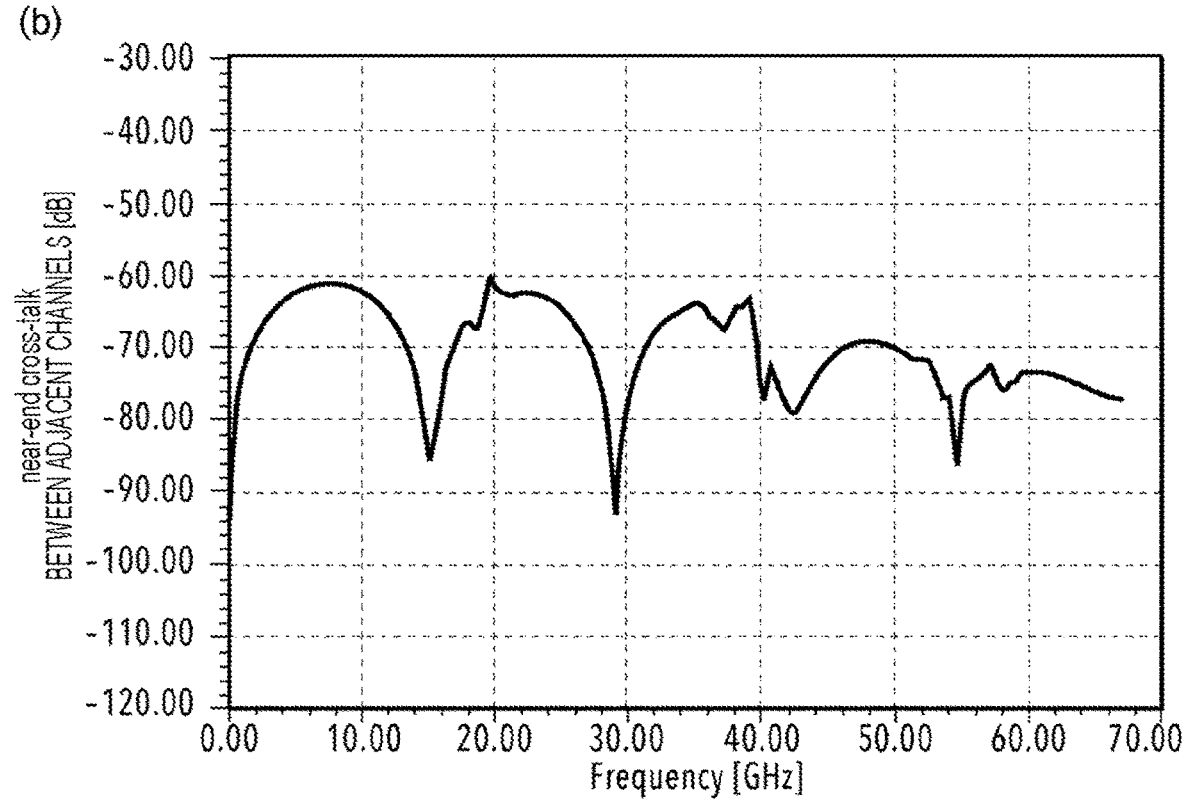

By following this arrangement rule, even the SS line configuration can realize excellent crosstalk equivalent to the configuration of GSSG, GSGSG, or the like. As a result of actual simulation with this configuration, an extremely excellent radio frequency characteristic in which the FAR-END crosstalk characteristic and the NEAR-END crosstalk characteristic between adjacent channels are −50 dB up to 70 GHz has been confirmed as illustrated in FIGS. 10(a) and 10(b).

When considering the transmission characteristic, it is desirable that the near-end and far-end crosstalk characteristics of the differential signal between adjacent channels are −30 dB or less in a required frequency bandwidth, and this configuration can realize a sufficient characteristic.

Moreover, although the length is extremely small in comparison with the phase modulation unit, it is desirable that the lead-out line portion and the termination portion are also formed according to similar rules.

(Formation of Taper)

When considering the radio frequency loss, it is necessary to shorten the lead-out wire portion as much as possible. In particular, with the present optical layout configuration, the length of the lead-out line can be shortened.

Moreover, since there is generally no capacitance loading structure in the radio frequency wiring portion of the lead-out line portion and the termination portion, the impedance increases with the same signal line width being maintained when the signal line is formed on the same dielectric layer.

On the other hand, in order to achieve impedance matching, it is necessary to make the line width of the radio frequency wiring portion of the lead-out line portion or the termination portion thicker than that of the capacitance-loaded portion. When the line width is made thicker, the crosstalk characteristic is deteriorated, and therefore, the length of the lead-out line portion or the termination portion is preferably as short as possible.

In order to make the width thicker, it is desirable to form a taper of approximately 50 µm and smoothly connect the phase modulation unit from the viewpoint of impedance matching.

With the present layout, the length of the lead-out line portion can be set to 400 µm or less, the influence on the propagation loss can be almost ignored (approximately 0.5 dB or less at 50 GHz), and the configuration is extremely advantageous in terms of frequency characteristics. Additionally, as illustrated in FIG. 8, the present layout also include a straight lead-out line 814XIa, 814Xib, 814XQa, 814XQb.

(Arrangement of DC Phase Adjustment Electrodes)

Next, the arrangement of the DC phase adjustment electrodes (heater electrode of DC phase adjuster, the DC phase adjuster performs phase adjustment by thermal effect from a heater) will be described.

Figure 11:
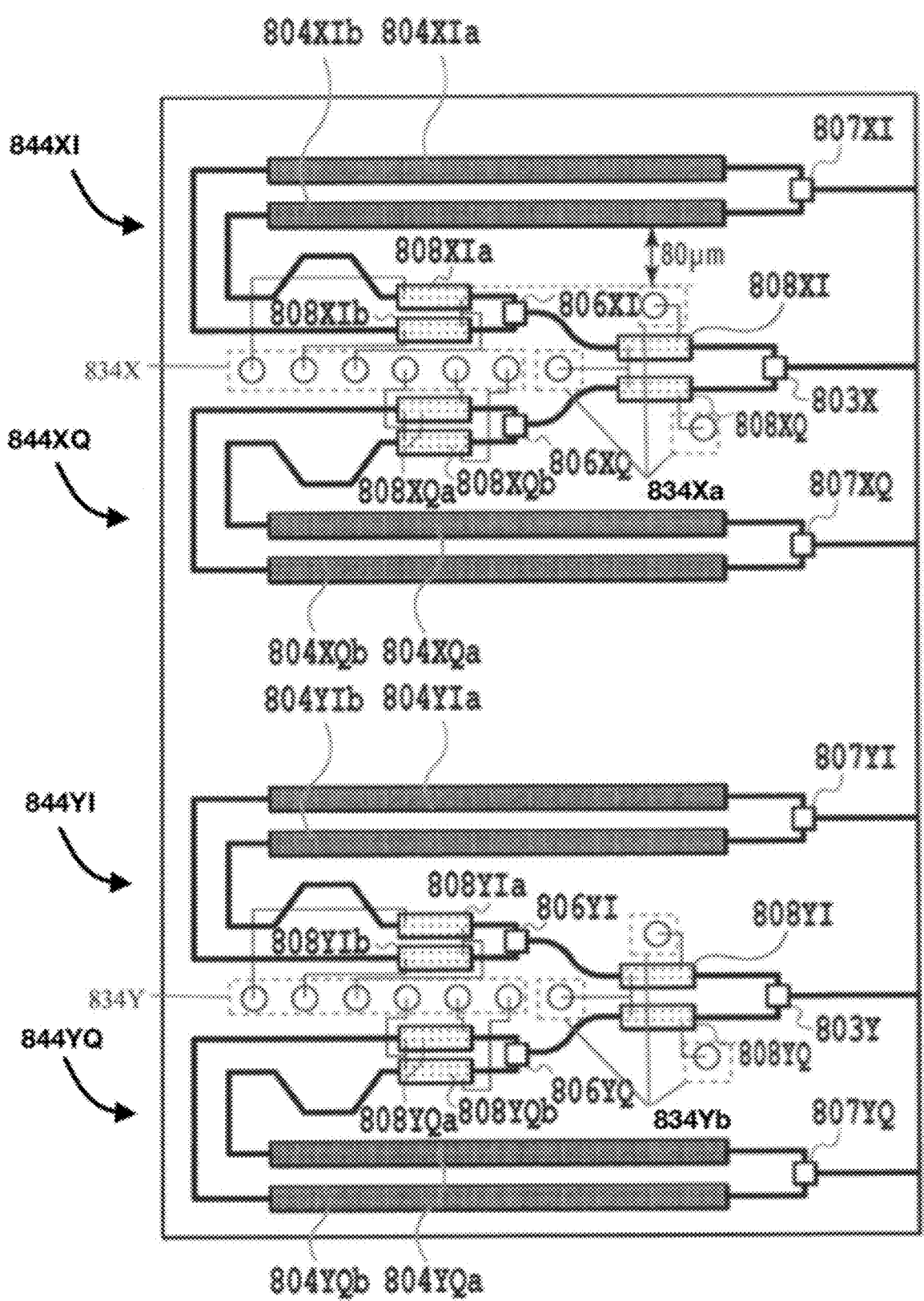
FIG. 11 is a diagram illustrating a part of an entire pattern of a polarization multiplexing type IQ modulator according to an embodiment of the present invention.

FIG. 11 schematically illustrates a mask diagram of a part of the entire pattern of the polarization multiplexing type IQ modulator of the embodiment illustrated in FIG. 5. In FIGS. 5 and 8, the same elements are denoted by the same numbers. The position of a PAD that supplies power to a heater electrode of a DC phase adjustment unit is indicated by a circle. The PADs 834X are arranged between the heater electrodes of the DC phase adjusters 808XIb and 808XQa of the child MZMs 844XI and 844XQ, and no PAD is arranged between the IQ modulator on the X polarization channel side and the IQ modulator on the Y polarization channel side. The PADs 834Y are arranged between the heater electrodes of the DC phase adjusters 808YIb and 808YQa of the childs MZMs 844YI and 844YQ. A region between RF lines of the two adjacent semiconductor IQ modulators may be formed by a dielectric only.

Figure 12:
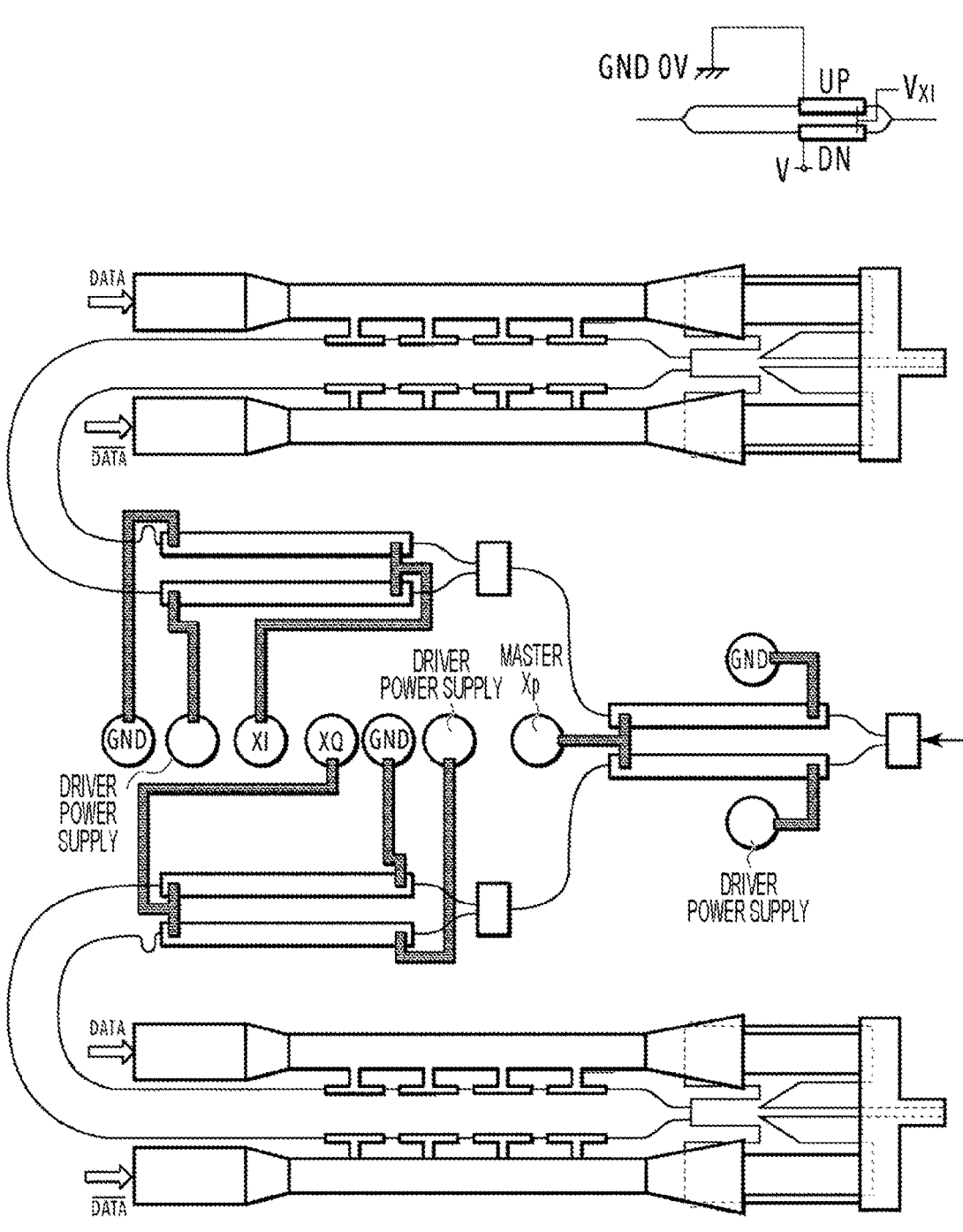
FIG. 12 is a diagram illustrating a connection example of a power supply according to a drive system of a DC phase adjustment unit of a polarization multiplexing type IQ modulator according to an embodiment of the present invention.

FIG. 12 illustrates connection example 1 of a power supply according to the drive system, and illustrates an example of a case where only one voltage source for phase adjustment is connected for each interference system to form a voltage push-pull drive configuration. The following figures will schematically show the shapes of the optical waveguides.

Although the shape of a PAD that supplies power to a heater electrode of a DC phase adjustment unit is indicated by a circle in FIG. 12, the shape is not limited. Moreover, the way of pulling the wiring and the arrangement of the PAD are examples. Each optical waveguide i indicated by a schematic shape with a thin line for reference, and an optical demultiplexer, an optical multiplexer, and the like are indicated by a rectangle. Moreover, a drive image for supplying electric power to the heater electrode is illustrated in a simplified manner in the upper right part of the figure.

Figure 13:
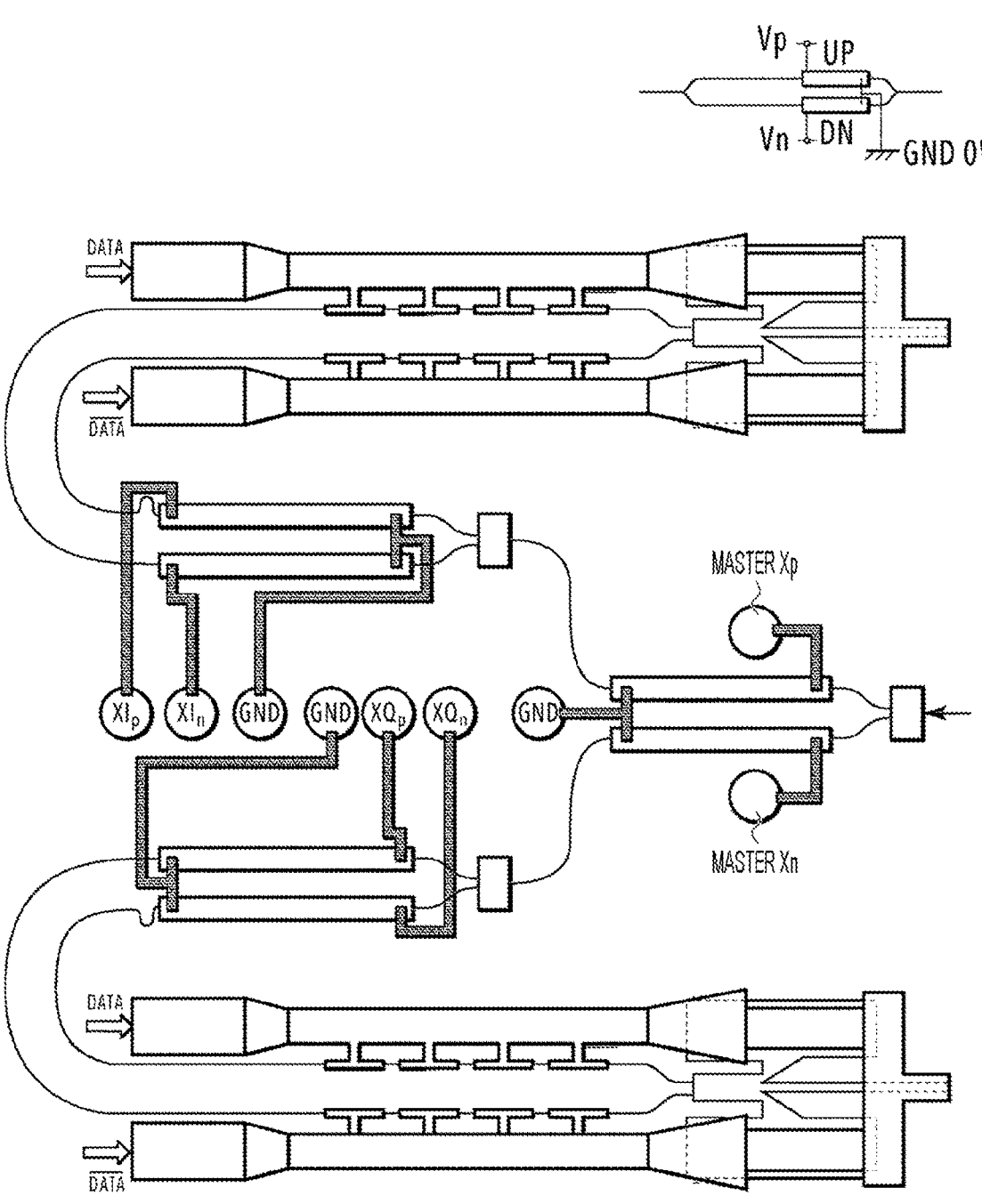
FIG. 13 is a diagram illustrating a connection example of a power supply corresponding to a drive system of a DC phase adjustment unit of the polarization multiplexing type IQ modulator according to an embodiment of the present invention.

FIG. 13 is connection example 2 of a power supply according to a drive system, and is an example in which two voltage sources for phase adjustment are provided for each interference system. This is an example of a case where it is possible to arbitrarily select and drive either one by individual drive.

Although the PAD shape is indicated by a circle, the shape is not limited. Moreover, the way of pulling the wiring and the arrangement of the PAD are examples. The optical waveguide is indicated by a schematic shape with a thin line for reference, and a demultiplexer, a multiplexer, and the like are indicated by a rectangle. Moreover, a drive image for supplying electric power to the heater electrode is illustrated in a simplified manner in the upper right part of the figure.

With this configuration, although the GNDs at the center may be collectively provided and five PADs may be provided on the child side, the GNDs can also be divided when considering sharing with the layout example 1 in FIG. 12.

Figure 14:
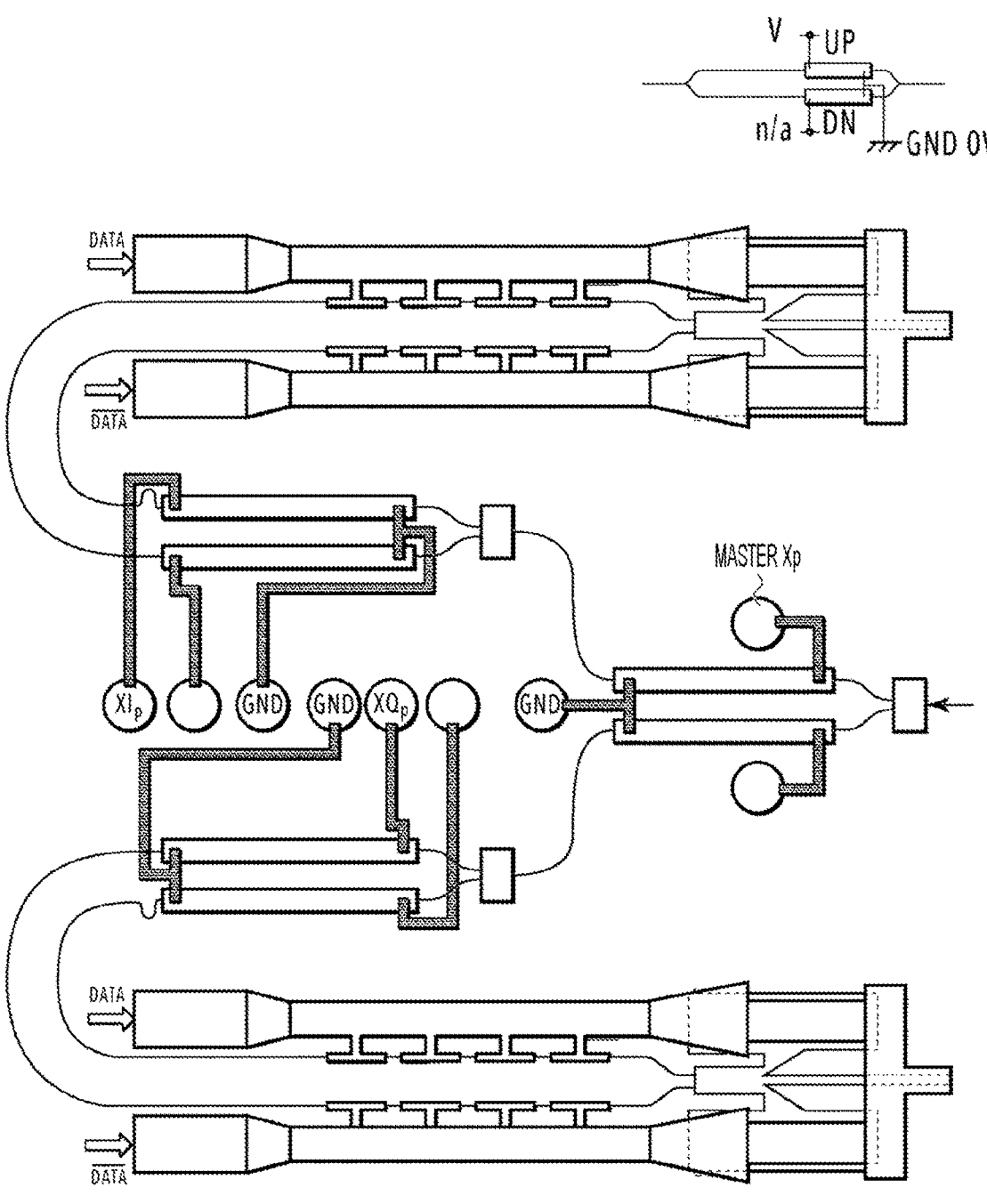
FIG. 14 is a diagram illustrating a connection example of a power supply corresponding to a drive system of a DC phase adjustment unit of a polarization multiplexing type IQ modulator according to an embodiment of the present invention.

FIG. 14 illustrates connection example 3 of a power supply according to a drive system, and illustrates an example in which one voltage source for phase adjustment is provided for each interference system. This is an example in which it is possible to arbitrarily select and drive either one by individual drive.

Although the PAD shape is indicated by a circle, the shape is not limited. Moreover, the way of pulling the wiring and the arrangement of the PAD are examples. The optical waveguide is indicated by a schematic shape with a thin line for reference, and a demultiplexer, a multiplexer, and the like are indicated by a rectangle. Moreover, a drive image for supplying electric power to the heater electrode is illustrated in a simplified manner in the right part of the figure. Although the p side is joined, only the n side may be joined.

Although the number of PADs can be decreased, the PADs can be left when considering that the PADs are also shared by layout examples 1 and 2.

In the configurations illustrated in FIGS. 12 to 14, the DC phase adjustment electrode and the DC wiring for connection with the connection PAD thereof are arranged inside the I-side phase modulation unit and the Q-side phase modulation unit in order to decrease the chip size as much as possible (the length of the radio frequency signal in the propagation direction).

It is also possible to arrange the DC phase adjustment electrode and the like over a region of a portion (lead-out line portion or termination portion) other than the portion of the phase modulation unit. However, since the phase modulation unit has the narrowest width and the longest length as described above, it is desirable to arrange the DC phase adjustment electrode and the like in the region of the phase modulation portion from the viewpoint of a space between channels.

Moreover, particularly in a case where the lead-out line portion is connected with the driver IC, the electromagnetic field distribution spreads in this region when considering connection with a wire or the like, and thus, it is not desirable to have the DC phase adjustment electrode in the vicinity thereof.

However, if the radio frequency line, the DC phase adjustment electrode, the PAD thereof, and the wiring for performing the phase modulation are arranged without any consideration, the radio frequency signal is coupled to the DC phase adjustment electrode at a specific frequency, and the radio frequency characteristic such as the crosstalk or the original transmission characteristic is deteriorated. Therefore, attention needs to be paid.

Specifically, when the DC phase adjustment electrode is spaced apart from the signal line of the phase modulation unit by at least 80 µm or more, it is desirable from the viewpoint of a crosstalk characteristic of the radio frequency signal and the like.

Moreover, when considering an actual layout, it is desirable from the viewpoint of a radio frequency characteristic that not only a DC phase adjustment electrode but also a PAD for connecting and expanding the DC phase adjustment electrode to another member with a wire or the like, or a DC wiring joining the PAD with the DC phase adjustment electrode are provided, and these are similarly spaced apart from the signal line of the phase modulation unit by at least 80 μm or more.

In particular, the PAD has a size of approximately Φ100 μm and may be larger in terms of area than the DC phase adjustment electrode, the DC wiring, and the like, and therefore, attention needs to be paid to the arrangement since there is a concern about the influence on the radio frequency characteristic.

From the above viewpoint, it is appropriate that the PAD unit is at a distance from the phase modulation unit as much as possible, and it is best that the PAD for applying voltage to the DC phase adjustment electrode for the child MZ is formed in a region between the two child MZs constituting the IQ modulator.

On the other hand, in the DC phase adjustment electrode for the parent MZ, it is desirable to close the interferometer immediately after the adjustment with the phase modulation electrode of the parent MZ in consideration of operation such as the phase fluctuation, and therefore, it is difficult to arrange the PAD for applying voltage inside the parent MZ at a distance from the parent MZ.

Therefore, in the sense that the PAD 834X of the DC phase adjustment electrode 808XIa, 808XQb is kept as far away as possible, it is desirable that at least one or more PADs 834X are formed between the two child MZs 844XI, 844XQ as illustrated in FIG. 11, and the remaining PADs 834Xa not formed between the two child MZs 844XI, 844XQ are arranged inside the DC phase adjustment electrode 808XIb, 808XQa, of the child MZ 844XI, 844XQ (a position spaced apart from the signal line of the phase modulation unit by 80 μm or more, a position farther from the signal line than the DC phase adjustment electrode 808XIa, 808XQb of the child MZ 844XI, 844XQ). As illustrated in FIG. 11, similarly to the PAD 834X of the DC phase adjustment electrode of the parent MZ 844X, it is desirable that the DC phase adjustment electrode 808YI, 808YQ of the parent MZ 844Y is also arranged on the inner side (a position farther from the signal line than the DC phase adjustment electrode 808YIa, 808YQb of the child MZ 844YI, 844YQ) than the DC phase adjustment electrode 808YIa, 808YQb of the child MZ 844YI, 844YQ arranged at a position closest to the main signal line.

Moreover, in the sense of further reducing the influence of the radio frequency signal, it is desirable that the PAD is manufactured so as to be dug closer to the semiconductor substrate side than the DC phase adjustment electrode portion.

Specifically, it is desirable that the PAD for applying voltage to the DC phase adjustment electrode is formed directly on a silicon oxide film (SiO$_2$) or a silicon nitride film (SiN or SiON) formed on the semiconductor substrate.

Although it is also possible to form the PAD directly on the semiconductor substrate, it is desirable from the viewpoint of electrical isolation to form the PAD directly on a silicon oxide film (SiO$_2$) or a silicon nitride film (SiN or SiON) formed on the semiconductor substrate, rather than directly on the semiconductor substrate or another semiconductor layer.

(Heater Electrode of DC Phase Adjuster and PAD)

Figure 15:
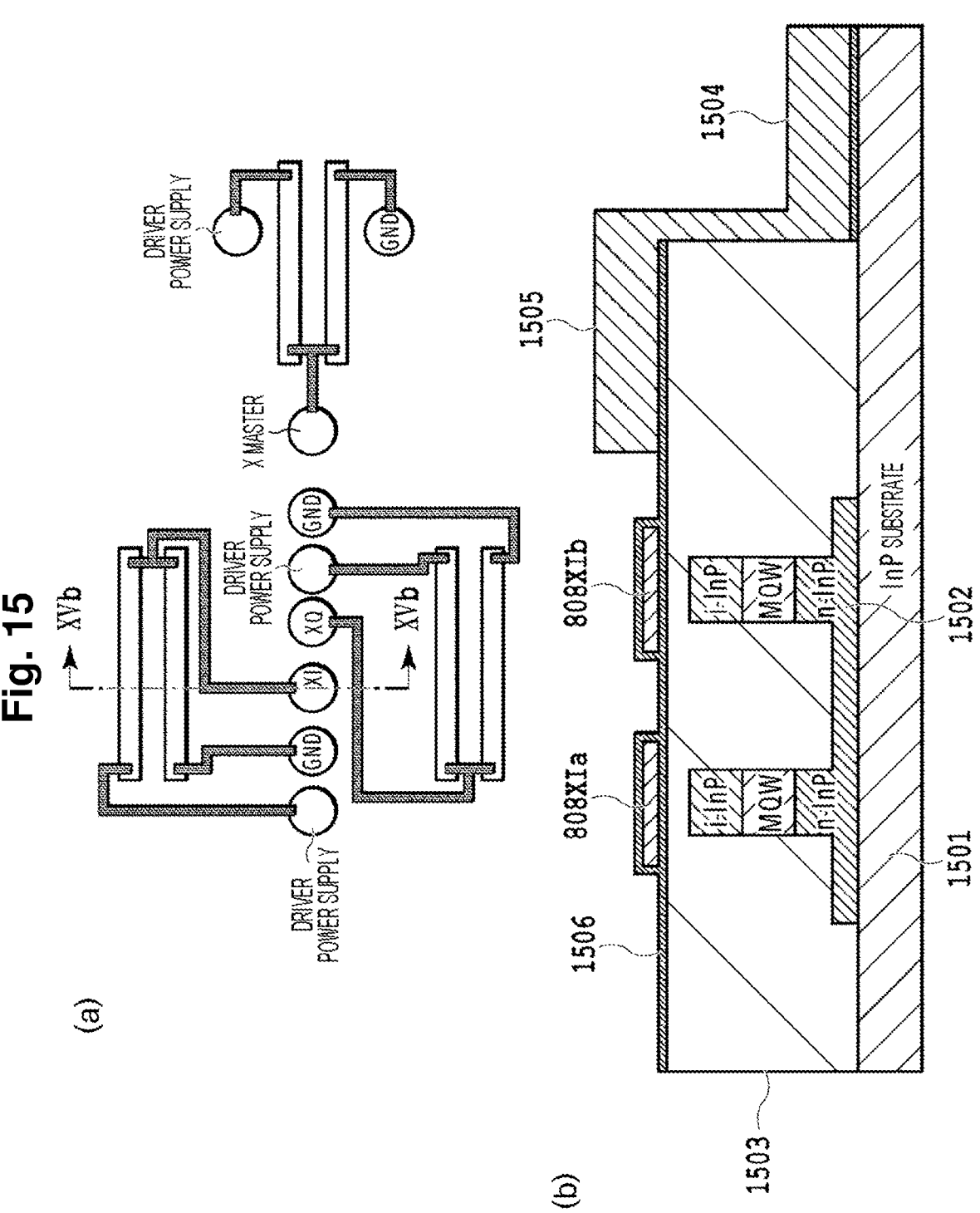
FIG. 15(a) is a plan view illustrating a position of a cross section of a polarization multiplexing type IQ modulator according to an embodiment of the present invention, the cross section traversing a DC phase adjustment electrode and a PAD for applying voltage.
FIG. 15(b) is a substrate cross-sectional view thereof.

FIG. 15(a) is a plan view illustrating a position of a cross section traversing the heater electrodes of the DC phase adjusters 808XIa and 808XIb of the child MZ and the PAD for applying heater voltage, and FIG. 15(b) is a substrate cross-sectional view thereof. Wiring 1505 joining the heater electrodes 808XIa and 808XIb with a PAD 1504 for applying heater voltage is formed on at least one or more dielectric materials (illustrated as a BCB layer 1503 or the like in the substrate cross-sectional view of FIG. 15) formed on a semiconductor substrate 1501. In one example, the wiring is formed on at least one or more dielectric materials, or formed directly on a semi-insulating semiconductor substrate. In this way, the wiring can be formed flat on the same plane as the DC phase adjustment electrode, so that the waveguide structure can be bridged, and the present layout can be realized.

If the DC wiring is formed directly on the silicon oxide film (SiO$_2$), the silicon nitride film, or (SiN or SiON) on the semiconductor substrate similarly to the PAD unit 1504, the DC wiring cannot pass over the waveguide unit, and therefore, it is difficult to realize the present layout.

Although the BCB layer 1503 is illustrated in the cross-sectional view of FIG. 15(b) as the dielectric material of at least one or more layers, the dielectric material may be a semiconductor layer laminated on a semiconductor substrate, or any other dielectric. The heater electrodes 808XIa and 808XIb may be covered with a layer 1506 of SiO$_2$, SiN, or SiON. The electrode 1504 of the PAD unit may be formed on SiO$_2$/SiN/SiON 1506, or may be formed on an n-InP layer 1502.

By protecting the DC phase adjustment electrode (heater electrode) with the layer 1506 of SiO$_2$, SiN, SiON, or the like, it is possible to prevent the resistor from being oxidized. At this time, the radio frequency electrode may also be covered similarly with SiO$_2$, SiN, SiON, or the like. In this case, since the film is covered with a material having a dielectric constant higher than that of air, the spread of the radio frequency can be suppressed to some extent, and the effect is exhibited, although slightly, in suppressing the crosstalk characteristic.

Moreover, it is desirable that the DC phase adjustment mechanism is configured by a heater electrode.

Although it is clear that a DC phase adjustment mechanism that uses an electro-optical (EO) effect or the like is also possible, since an InP-based modulator generally uses an effect associated with absorption, the phase change amount increases as a voltage is applied. However, the optical loss increases, since the loss also increases. Moreover, there is a possibility that an optical power is unbalanced due to an optical loss, leading to deterioration of an extinction ratio.

Moreover, from the viewpoint of a required drive voltage, there is an advantage in that the heater electrode only requires a drive voltage of half or less as compared with the EO type electrode, while a DC phase adjustment electrode that uses the EO effect may generally require a voltage of 10 V or more.

Moreover, by using the heater electrode, the same resistor as the on-chip termination resistors 302a and 302b illustrated in FIG. 9 can be used, for example, and it is also advantageous in that the manufacture can be facilitated.

On the other hand, as a disadvantage, an effect is obtained using heat unlike the EO type electrode, and therefore, management of thermal XT (crosstalk) is important.

For example, if there is heat crosstalk (XT) between IQs, there is a possibility that the phase state cannot be adjusted well if the child MZ (XI) deviates from the optimum value due to the heat XT during the adjustment of the child electrode (XQ) after the electrode (XI) of the child MZ is adjusted.

Therefore, from the viewpoint of operation stability, it is desirable to suppress the change amount of the phase given to the Q side when the phase adjustment on the I side is performed to at least 3% or less, for example.

In order to achieve a design in which the change due to the thermal XT is sufficiently suppressed as described above, the distance between the heater electrodes of the I and Q channels needs to be at least 100 μm or more from the viewpoint of thermal crosstalk.

In order to utilize the low-voltage drivability of the heater electrode different from the EO type electrode described above, it is desirable to design so that the heater electrode can be driven within 5 V, for example.

On the other hand, from the viewpoint of reliability, it is desirable that the current value flowing through the heater electrode is approximately 50 mA or less. Therefore, it is desirable that the resistance value used for the heater is 100 ohm or more.

Similarly, although it is clearly desirable that the heater electrodes for the X polarized wave and the Y polarized wave are sufficiently spaced apart, in the configuration of the present embodiment, as can be seen from FIG. 11 and the like, a sufficient distance can be taken between X and Y as compared with between I and Q in the layout of the radio frequency line, and therefore, it is not particularly necessary to limit the distance as a numerical value.

Similarly, since it is unnecessary to arrange the DC phase modulation electrode between X and Y, it is unnecessary to arrange a conductor that greatly affects the radio frequency characteristic between X and Y for which crosstalk more severe than that between the IQs is generally required. Only the dielectric can be present between X and Y, and for example, the configuration of the present invention can improve the crosstalk between X and Y as compared with the crosstalk between I and Q while the pitch between the channels remains the same without using means such as widening the channel chip only between X and Y.

The configuration in FIG. 6 of the polarization multiplexing type IQ modulator of the present embodiment is provided with optical cross waveguides that do not supply light crossing a channel having no optical waveguide crossing the basic configuration in FIG. 5, that is, dummy optical cross waveguides 902X' and 902Y'. With such a configuration, the numbers of waveguide crossings between X and Y channels and between I and Q channels become equal, and therefore, a difference in optical characteristics between the channels can be eliminated.

Moreover, the configuration in FIG. 7 of the polarization multiplexing type IQ modulator according to an embodiment of the present invention is a configuration in which the XY polarization separator 1030 is formed by joining the 1-input 2-output type optical demultiplexer 1031, the DC phase adjuster 1032, and the 2-input 2-output type optical multiplexer/demultiplexer 1033 in this order, and it is possible with the present mechanism to achieve compensation of an optical insertion loss difference polarization dependent loss (PDL) between channels of the X polarized wave and the Y polarized wave without loss while maintaining the total optical intensity.

As the PDL compensation mechanism, not only the present configuration but also a configuration that uses a more general variable optical attenuator (VOA) may be used.

As described above, since the configurations in FIGS. 6 and 7 of the present invention are obtained by changing the additional optical layout/element in the basic form in FIG. 5, the effects obtained by the present patent do not change.

In addition, as long as the patent configuration of the present invention is satisfied, not only the above configuration but also an optical layout or an optical component may be different, or a function may be added.

Second Embodiment (HB-CDM Mode: Driver IC Integration)

Next, an HB-CDM mode in which a driver IC and a modulator chip are integrated will be described as a second embodiment of the present invention.

(Channel Pitch)

When the driver IC and the modulator are connected, it is essential to align channel pitches of radio frequency lines (at least a radio frequency line PAD connected with the driver IC) of the modulator and the driver IC.

This is because, when the wire length at the time of connecting the modulator with the driver IC is too long and the inductance is too large, the radio frequency characteristic is deteriorated as compared with the case where the inductance is small.

In terms of reducing the inductance, for example, it is possible to reduce the inductance by shortening the wire as much as possible and making the number of wires plural, or performing flip-chip mounting.

Moreover, since the radio frequency line of the modulator described in the first embodiment has the SS differential line configuration, it is essential to design in consideration of crosstalk.

When considering wire connection with a driver, PAD arrangement having a ground electrode such as GSSG or GSGSG is generally arranged on the driver side. Therefore, in order to suppress crosstalk, it is possible to suppress leakage spread of electromagnetic field distribution from a signal line by joining the ground electrode of the driver in a form of covering a wire connecting the signal electrode of the driver and the signal electrode of the modulator.

Although one wire may be used to connect the ground electrodes, it is clear that a large effect can be obtained when connecting the ground electrodes with a plurality of wires.

In the case of the GSGSG configuration, only the right and left ground electrodes may be connected without connecting the central ground electrode, or the three ground electrodes may be connected by wires.

(Countermeasure Against in-Phase Mode)

Moreover, since the radio frequency line of the modulator has the SS line configuration, when the in-phase mode is inputted to the modulator, the in-phase mode cannot be propagated, and is radiated.

For example, since the driver IC may have an in-phase gain, when an in-phase mode is inputted to the SS radio frequency line of the modulator via the driver, the in-phase mode is radiated and radiated into the package of the HB-CDM, and is coupled to some metal pattern or the like, which may cause characteristic deterioration such as resonance at a specific frequency or causing crosstalk when viewed as a radio frequency characteristic.

Therefore, in a modulator that uses the SS radio frequency line that cannot transmit the in-phase mode, it is desirable to install a broadband radio wave absorber and the like at the same level as the operation frequency as much as possible on the surface on the modulator side of the cover (lid) for hermetically sealing the package.

However, since the radio wave absorber is more expensive as the frequency bandwidth is wider, a radio wave absorber in a frequency bandwidth in which a level of preventing a specific resonance frequency is suppressed may be selected.

For example, in an optical module in which a semiconductor Mach-Zehnder modulator is mounted in a package and the package is hermetically sealed, it is possible to adopt a configuration of a semiconductor IQ modulator in which a broadband radio wave absorber for preventing and absorbing an emitted noise signal from being coupled to a signal line is formed on an inner side (package inner side) of a cover (lid) at the time of hermetically sealing.

These configurations are effective not only for the HB-CDM but also for all the optical transmission modules in which a driver IC and a modulator chip are integrated/mounted in the same package.

Third Embodiment

Figure 16:
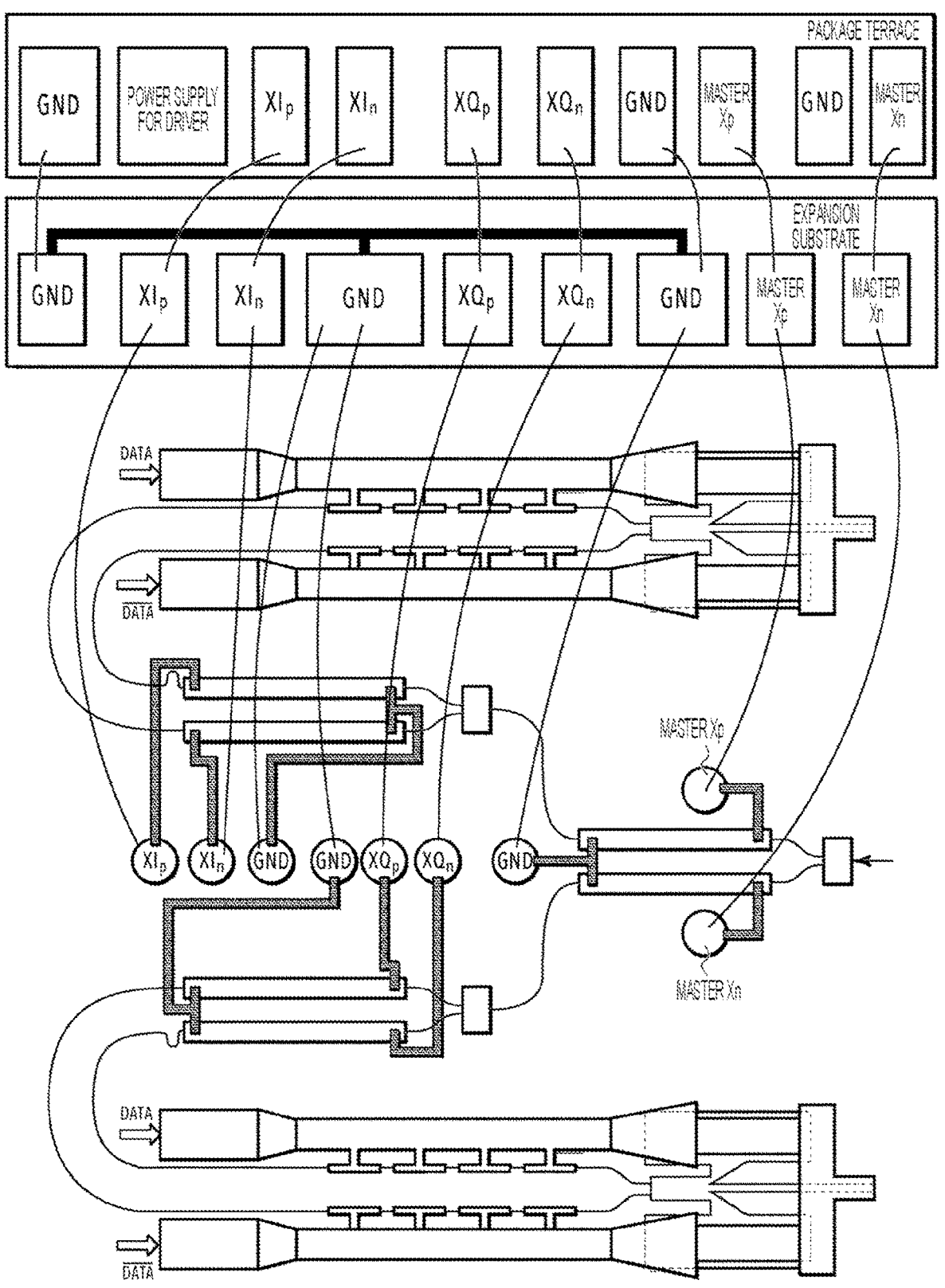
FIG. 16 is a diagram illustrating a layout example of a PAD including an expansion substrate according to an embodiment of the present invention.
Figure 17:
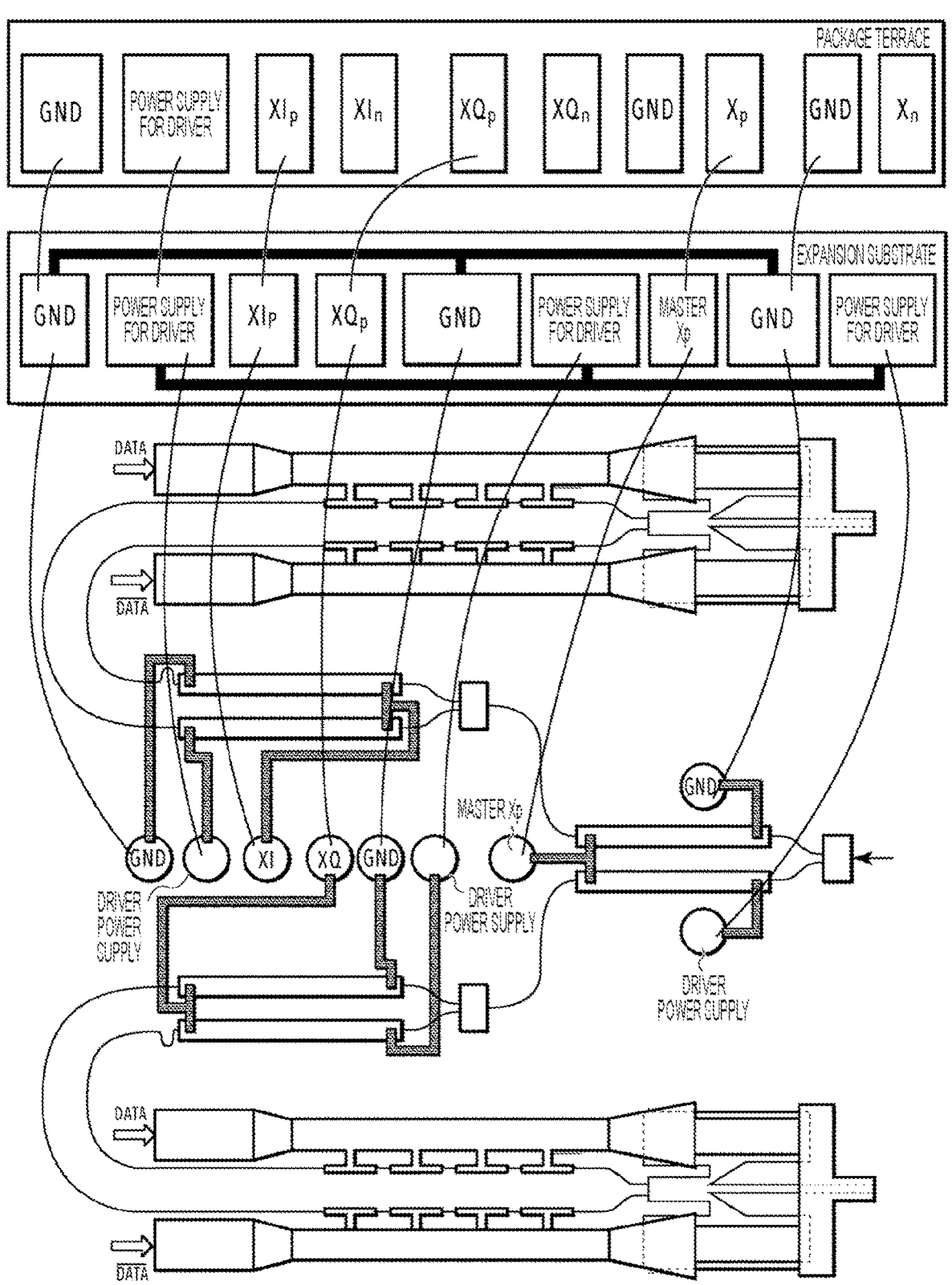
FIG. 17 is another diagram illustrating a layout example of a PAD including an expansion substrate according to an embodiment of the present invention.

As the third embodiment of the present invention, FIGS. 16 and 17 illustrate two examples of a diagram (lower stage of FIGS. 16 and 17) illustrating PAD arrangement around the DC phase adjustment electrode of the chip substrate of the polarization multiplexing type IQ modulator, a diagram (middle stage of FIGS. 16 and 17) of the expansion substrate that relays the wire led out from the PAD, and a layout diagram (upper stage of FIGS. 16 and 17) of the package PAD arranged on the package terrace of the modulator module. In the three-stage substrate in each figure, the corresponding PADs are connected by wires.

In the layout of the package PAD in the upper part of FIGS. 16 and 17, the PAD on the Y polarization side (not shown) can be arranged on the right side of the figures, or the PAD on the Y polarization side may be provided on a package terrace different from the PAD on the X polarization side.

When the thickness of the expansion substrate in each of the middle stages in FIGS. 16 and 17 is the same as that of the modulator substrate, wires may be easily applied. Moreover, the order on the expansion substrate can be changed so that the power push-pull type layout and the voltage push-pull type layout can be shared.

As a drive system of the heater, three systems according to connection examples 1, 2, and 3 illustrated in FIGS. 12, 13, and 14 are conceivable.

The most general configuration is the configuration of connection example 2 illustrated in FIG. 16. With this configuration, the most ideal push-pull drive can be realized as the phase adjustment method. However, two control power supplies are required.

Although a derivation of connection example 2 is not illustrated, since only one of p and n is connected, there is an advantage that the number of necessary voltages can be decreased as compared with connection example 2 in which each of the p side and the n side is connected. On the other hand, since the push-pull drive cannot be performed, there is a disadvantage that a required voltage increases or the push-pull drive is weak against long-term fluctuations.

The configuration of connection example 1 illustrated in FIG. 17 is also conceivable as a configuration having a combination of good points of connection example 2 and a derivation of connection example 2. In the configuration of connection example 1, the power supply voltage for driving the driver IC, which is always used in the HB-CDM, is connected in parallel also for the heater electrode, so that the push-pull drive can be realized in a state where the number of control power supplies is decreased to one.

In the HB-CDM, an open collector type driver IC or an open drain type driver IC is generally used, and in this case, a voltage is applied to the driver IC via a termination portion of a modulator. The same voltage source as the voltage source for the driver IC is used in combination as a power supply for the heater electrode. In a case where the driver IC is not the above driving method, the above power supply cannot be prepared, and in that case, another power supply is required. However, since a common power supply may be used for all the DC phase adjustment electrodes, the number of power supplies can be significantly reduced as compared with the configuration of connection example 2.

As illustrated in FIGS. 16 and 17, three electrode PADs are generally required for each MZ for heater driving. By the routing of wiring in FIGS. 16 and 17 and the derivation and the layout of the PAD, it is possible to select any of the above operation methods by selecting the configuration of the expansion substrate and the connection configuration of the wire at the time of connection to the lead pin or the like of the package, by adjusting the arrangement via any at least one or more development substrates while maintaining the chip-like layout.

Moreover, in a case where the configuration of connection example 1 in FIG. 17 is selected, the number of PADs can be greatly reduced. By reducing the number of PADs, the number of connected wires or the metal region can be decreased, which is advantageous from the viewpoint of cost reduction.

Figure 18:
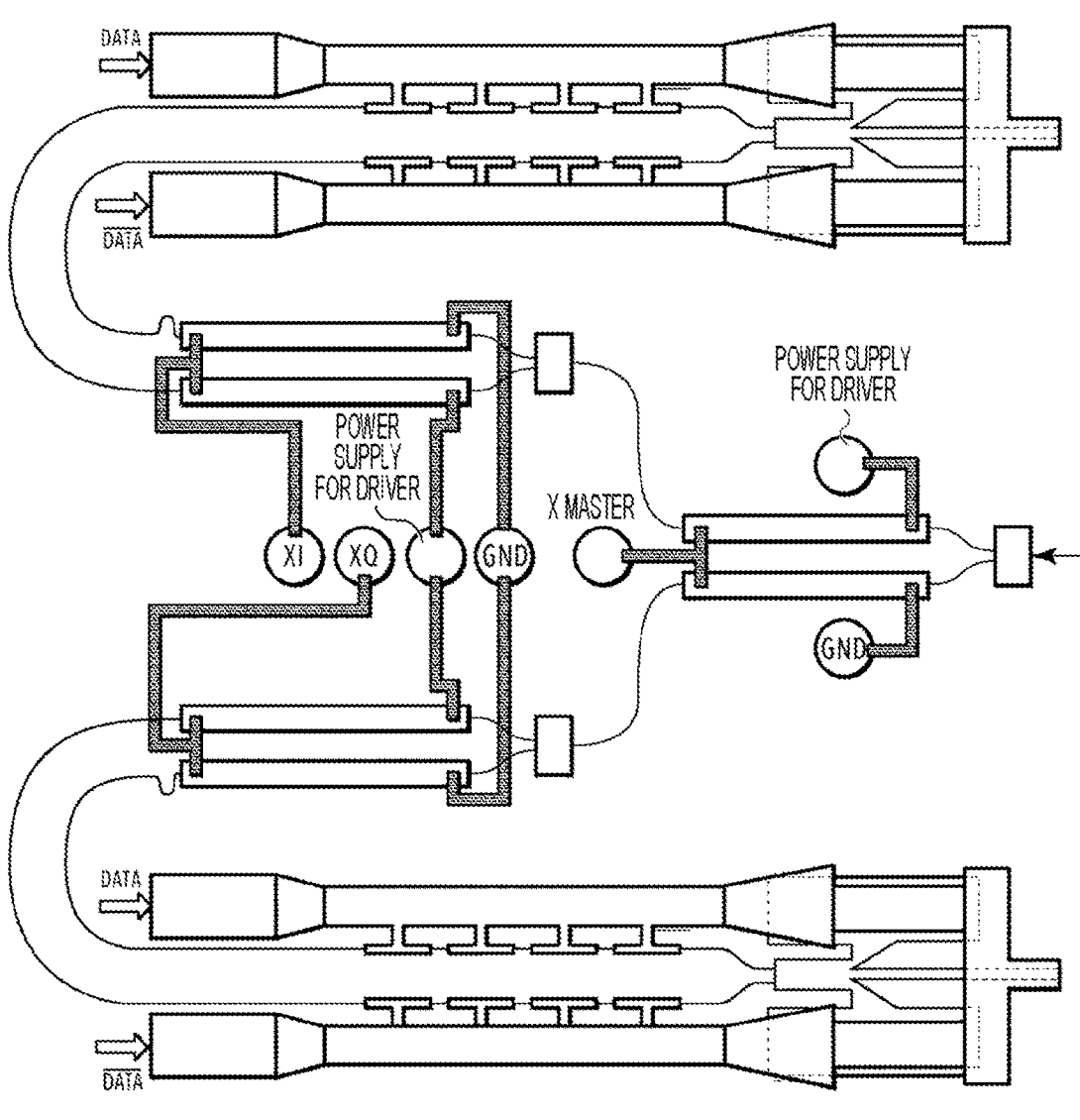
FIG. 18 is a diagram illustrating a layout example of a PAD including multilayer wiring according to an embodiment of the present invention.
Figure 19:
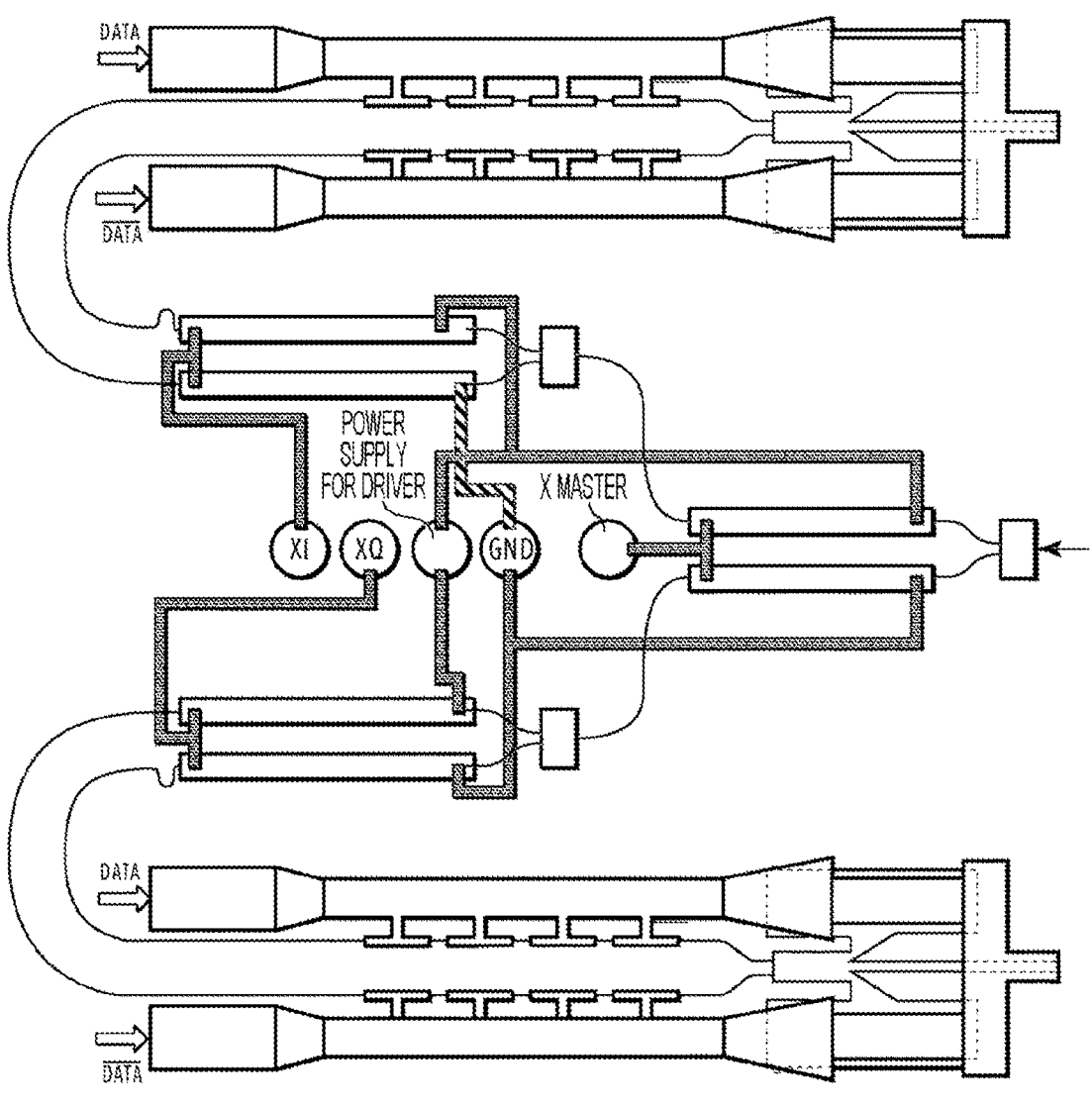
FIG. 19 is a diagram illustrating a layout example of a PAD including multilayer wiring according to an embodiment of the present invention.

As illustrated in FIGS. 18 and 19, the total number of PADs of the child electrodes can be decreased to four. However, in order to make the method of changing the phase in I and Q the same, it is necessary to connect wiring as multilayer wiring.

Moreover, three PADs may be used for the parent MZ, or in the case of using a multilayer wiring, the number of PADs can be decreased to a total of five as illustrated in FIG. 19 collectively with the child electrode.

Figure 20:
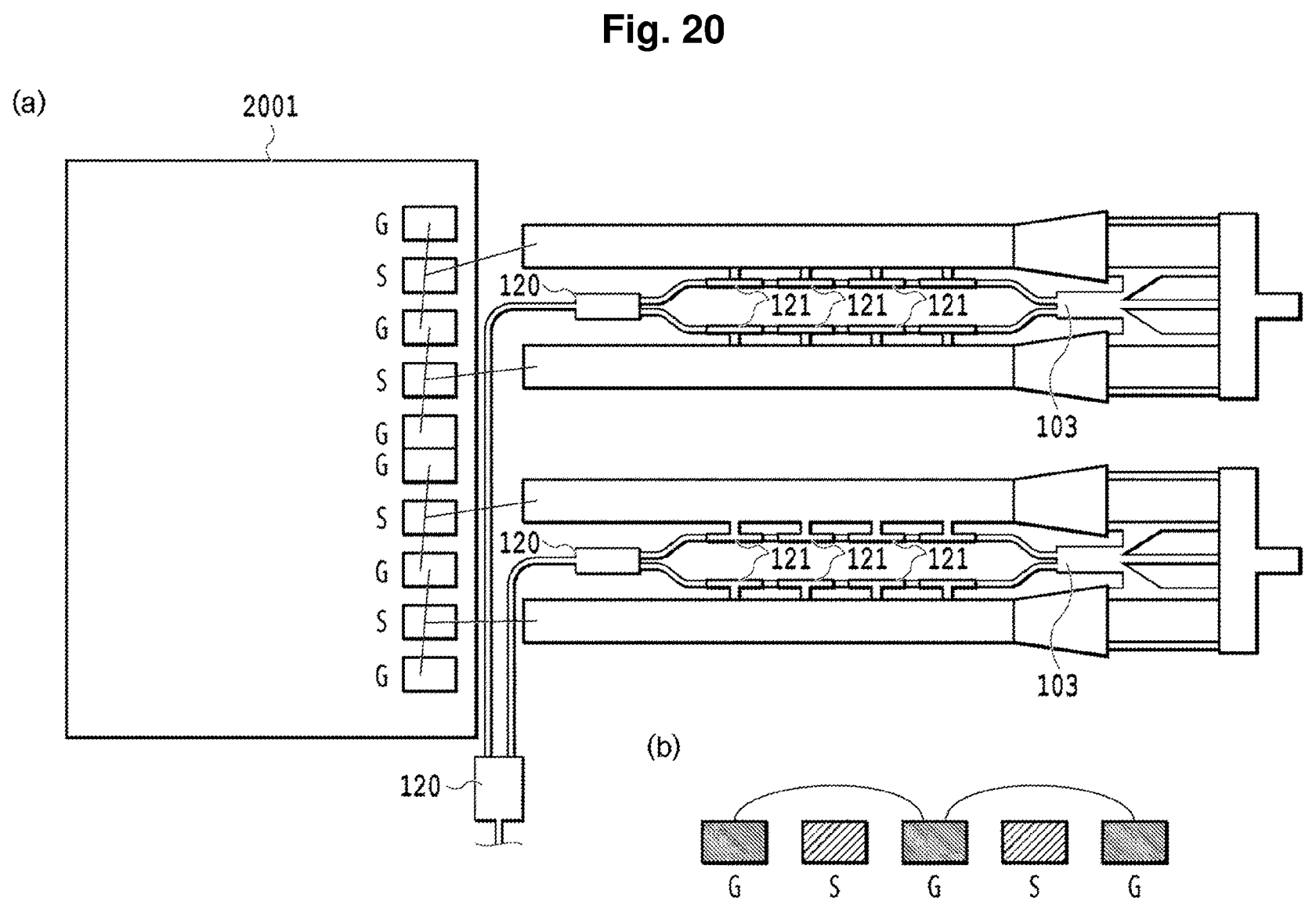

FIG. 20($a$) is a diagram in which the IQ modulator of the present invention is connected with a driver IC 2001 having the PAD of the GSGSG configuration, and FIG. 20($b$) is a cross-sectional image diagram of wire connection.

In the case of an IQ modulator, a 2ch driver IC is connected, and in the case of a twin-IQ modulator, a 4ch driver IC is connected.

FIG. 20($b$) explains that the GNDs of the driver PAD are joined by wires so as to cover the signal lines and the wires in order to suppress the spread of the electromagnetic field distribution from the wires or PADs of the signal lines and the occurrence of crosstalk.

The GND at the center of the GSGSG configuration may be without wire connection, and the same applies to the case of the driver IC having the GSSG configuration.

INDUSTRIAL APPLICABILITY

As described above, with the embodiment of the present invention, the SS differential line can be formed without deterioration of the crosstalk characteristic of the radio frequency line in the driver integrated type semiconductor IQ modulator, and the size can be reduced because there is no ground electrode.

The invention claimed is:

1. A semiconductor IQ modulator including at least two or more Mach-Zehnder (MZ) modulators configured with differential transmission lines coupled by two signal lines for transmitting radio frequency (RF) modulation signals comprising differential signals, wherein each differential transmission line has an SS line configuration, the SS line configuration consists of a straight lead-out line, a phase modulation unit, and a termination resistor, each phase modulation unit includes the differential transmission line having a differential capacitively loaded traveling-wave electrode (CL-TWE) structure as a phase modulation electrode, the phase modulation electrodes of each phase modulation unit between adjacent channels are spaced apart by at least 400 μm or more, a distance between main signal lines of the differential CL-TWE structures is 60 μm or less, a plurality of DC phase adjustment electrodes for adjusting an operating point of each of the at least two or more MZ modulators and a PAD for the plurality of DC phase adjustment electrodes are provided between each phase modulation unit on an I channel side and each phase modulation unit on a Q channel side, a DC phase adjustment electrode of the plurality of DC phase adjustment electrodes is spaced apart from the phase modulation electrode of each phase modulation unit by at least 80 μm or more, and near-end and far-end crosstalk characteristics of a differential signal between adjacent channels are −30 dB or less in a required frequency bandwidth.

2. The semiconductor IQ modulator according to claim 1, wherein the two or more MZ modulators include a parent MZ and two child MZs having a nested structure, a first DC phase adjustment electrode for the parent MZ among the plurality of DC phase adjustment electrodes is arranged at a position farther from the main signal line of the differential CL-TWE structure than a second DC phase adjustment electrodes of the plurality of DC phase adjustment electrodes for child MZs, a PAD for applying voltage to the second DC phase adjustment electrode for the child MZ among the plurality of the DC phase adjustment electrodes is formed between the two child MZs, and the PAD for applying voltage to the first DC phase adjustment electrode for the parent MZ includes:

a part formed between the two child MZs, and a remaining part arranged at a position farther from the main signal line of the differential CL-TWE structure than the second DC phase adjustment electrode for the child MZ.

3. A polarization multiplexing type semiconductor IQ modulator comprising two semiconductor IQ modulators according to claim 1 corresponding to channels having different polarizations, wherein RF lines constituted by differential CL-TWE structures constituting four MZ modulators are arranged with equal channel pitches, the two semiconductor IQ modulators are arranged mirror-symmetrically, and a region between RF lines of the two adjacent semiconductor IQ modulators is formed by a dielectric only.

4. The semiconductor IQ modulator according to claim 1, wherein the PAD for applying voltage to a second DC phase adjustment electrode is formed directly on a silicon oxide film or a silicon nitride film formed directly on a semiconductor substrate or formed directly on at least one or more semiconductor layers laminated on the semiconductor substrate, a wiring portion connecting a heater electrode of the second DC phase adjustment electrode with the PAD for applying voltage is formed on the silicon oxide film or the silicon nitride film, or a layer other than the at least one or more semiconductor layers, formed on at least one or more dielectric materials, or formed directly on a semi-insulating semiconductor substrate, and the PAD for applying voltage is formed on a substrate side with respect to the wiring portion.

5. The semiconductor IQ modulator according to claim 1, wherein a second DC phase adjustment electrode is a heater electrode, a resistance value of a resistor forming the heater electrode is 100 ohm or more, a distance between the heater electrode of the I channel and the heater electrode of the Q channel is at least 100 μm or more, and the resistor is covered with a silicon oxide film or a silicon nitride film.

6. The semiconductor IQ modulator according to claim 1, wherein each phase modulation unit is connected with a driver IC, a second DC phase adjustment electrodes are a heater electrodes, a voltage source of an arbitrary fixed voltage that applies a voltage for driving the driver IC can be configured to provide only one push-pull drive for each phase modulation unit, the heater electrode is connected with the voltage source, the at least two or more MZ modulators have two child MZs and a parent MZ, and (1) a I-channel side modulator and a Q-channel side modulator of the two child MZs each have two child electrode PADs, and the parent MZ has three parent electrode PADS, (2) a total of the two child electrode PADs and a parent electrode PAD is five, or (3) the two child MZs each have two child electrode PADs, the parent MZ has three parent electrode PADs, and the voltage source is configured to achieve the push-pull drive or is configured to achieve individual drive of supplying one or two voltages for phase adjustment for each phase modulation unit, and the driving configuration can be selected by adjusting a wiring pattern of an expansion substrate.

7. The semiconductor IQ modulator according to claim 1, wherein the main signal line of the SS line configuration is connected by a wire with a corresponding signal line of an open collector type or open drain type driver IC with a PAD having a GSSG or GSGSG configuration and RF lines, a ground pad between same channels of the driver IC is connected by at least one or more wires so as to cover an upper portion of the wire, and a crosstalk characteristic is suppressed.

8. An optical module in which the semiconductor IQ modulator according to claim 1 is mounted and hermetically sealed in a package having a lid, wherein a broadband RF absorber is formed on an inside of the lid of the hermetically sealed semiconductor IQ modulator for absorbing a noise signal emitted and preventing the noise signal from coupling to the main signal line.

* * * * *